(12) United States Patent
Hung et al.

(10) Patent No.: US 11,233,439 B2
(45) Date of Patent: Jan. 25, 2022

(54) WIRING DEVICE, MOTOR STATOR AND WIRING METHOD

(71) Applicant: Gogoro Inc., Wanchai (HK)

(72) Inventors: Po-Chang Hung, Taoyuan (TW);
Ching-Tan Yang, Taoyuan (TW);
Kai-Chiang Li, Taoyuan (TW);
Sung-Ching Lin, Taoyuan (TW)

(73) Assignee: GOGORO INC., Wanchai (HK)

( * ) Notice: Subject to any disclaimer, the term of this patent is extended or adjusted under 35 U.S.C. 154(b) by 280 days.

(21) Appl. No.: 16/441,194

(22) Filed: Jun. 14, 2019

(65) Prior Publication Data

US 2020/0395812 A1    Dec. 17, 2020

(51) Int. Cl.
*H02K 5/22* (2006.01)
*H02K 3/28* (2006.01)
*H02K 15/00* (2006.01)

(52) U.S. Cl.
CPC ............. *H02K 5/225* (2013.01); *H02K 3/28* (2013.01); *H02K 15/0068* (2013.01); *H02K 2203/09* (2013.01)

(58) Field of Classification Search
CPC ............ H02K 1/148; H02K 3/28; H02K 3/38; H02K 3/50; H02K 2003/06; H02K 2003/09
See application file for complete search history.

(56) References Cited

U.S. PATENT DOCUMENTS

2003/0201688 A1   10/2003  Yamamura et al.
2015/0137637 A1    5/2015  Jang et al.

FOREIGN PATENT DOCUMENTS

DE   10 2013 212 892 A1    1/2015
JP        2012222970 A    11/2012
JP       2014-197951 A    10/2014
(Continued)

OTHER PUBLICATIONS

Machine translation of JP 2014197951 A retrieved from ESPACENET, 2014.*

(Continued)

*Primary Examiner* — Quyen P Leung
*Assistant Examiner* — Minki Chang
(74) *Attorney, Agent, or Firm* — McCormick, Paulding & Huber PLLC

(57) ABSTRACT

A wiring device includes a plurality of trenches and a plurality of channel sets. The trenches at least include a first trench, a second trench and a third trench, bottoms of which are respectively located at different height positions. Each of the channel sets at least includes a first channel, a second channel and a third channel. The first channels penetrate the wiring device from an outer sidewall thereof to the first trenches, respectively, the second channels penetrate the wiring device from the outer sidewall thereof to the second trenches, respectively, and the third channels penetrate the wiring device from the outer sidewall thereof to the third trenches, respectively. The wiring device has the advantages of a simple structure and a low cost for molding and manufacturing, and is suitable to perform winding by a manual or automatic machine and thus can prevent first output wires of the coil windings with in phase or out of phase from entangling or knotting with each other.

19 Claims, 20 Drawing Sheets

(56) References Cited

FOREIGN PATENT DOCUMENTS

JP    2014197951 A  * 10/2014  ............. H02K 3/522
JP    2018148666 A     9/2018

OTHER PUBLICATIONS

Extended European Search Report for European Patent Application No. 20167080.9 dated Sep. 15, 2020.
Notice of Reasons for Refusal for Japanese Patent Application No. 2020-074805 dated Mar. 24, 2021 and its English Translation.
Korean Office Action and its English translation corresponding to Patent Application No. 10-2020-0039414 dated Sep. 14, 2021.

* cited by examiner

S1

```
Inserting the first output wires of the first coil windings through the first
channels of the wiring device, respectively, and further configuring the
first output wires of the first coil windings to extend to the first trenches
of the wiring device
```

```
Rotating the motor stator, so that the first output wires of the first coil
windings extend along the first trenches to the collection position in the
first trenches of the wiring device
```

```
Moving the first output wires of the first coil windings, so that the first
output wires of the first coil windings extend toward the outside of the
wiring device
```

Inserting the first output wires of the third coil windings through the third channels of the wiring device, respectively, and further configuring the first output wires of the third coil windings to extend to the third trenches of the wiring device

Rotating the motor stator, so that the first output wires of the third coil windings extend along the third trenches to the collection position in the third trenches of the wiring device

Moving the first output wires of the third coil windings, so that the first output wires of the third coil windings extend toward the outside of the wiring device

FIG. 23

WIRING DEVICE, MOTOR STATOR AND WIRING METHOD

BACKGROUND OF THE INVENTION

1. Field of the Invention

The present invention relates to a wiring device, and more specifically to a wiring device, a motor stator comprising the wiring device, and a wiring method of the motor stator using the wiring device.

2. The Prior Arts

It is well known that 3-phase motors have been widely applied in various industrial fields due to its advantages of low cost, simple structure, and easy maintenance and repair. The 3-phase motor generally comprises a shell, a motor stator and a motor rotor. The motor stator is fixed onto the inside of the shell, and the motor rotor is rotatably provided in the motor stator. The motor stator comprises a core and multiple coil windings. The core comprises multiple silicon steel sheets and multiple H pillars. The silicon steel sheets are stacked and connected with each other to form a circular hollow pillar with a considerable thickness. The H pillars protrude from the internal perimeter of the circular hollow pillar and are spaced apart from each other along the internal perimeter of the circular hollow pillar. Specifically, a coil winding is formed by winding an insulation wire (that is, enameled wire) around two H pillars, and a total of twelve coil windings are symmetrically provided on the motor stator. Based on phase configuration, the coil windings can be divided into three different groups. In other words, four U phase coil windings may be grouped together, four V phase coil windings may be grouped together, and W phase four coil windings may be grouped together. The three groups of coil windings are interconnected to form a Y-shaped connection or a Δ-shaped connection and are further connected to a three-phase power. When the three-phase motor stator is powered by a balanced three-phase power, a constant rotating magnetic field is generated to drive the motor rotor to rotate.

For the three phase Y-shaped connection, the second output wires of all the coil windings are connected to a common node, which is known as a neutral point. If wires are connected to the neutral point, the system can be called as a three-phase four-wire system. For the three-phase Δ-shaped connection, the heads of the first and second output wires of all the coil windings are connected to the tails, respectively, without the existence of any neutral point. In this case, the system may be called as a three-phase three-wire system. Whichever connection is implemented, the first output wires of the coil winding in each group are jointly connected to a power source in the end.

There are no barrier objects between the first output wires of all the coil windings, thus it is possible to cause a risk of contact between the first output wires of the different phase of the coil windings at any time.

Also, the operator might inadvertently wire the first output wires of the coil windings with different phases.

Further, the first output wires of the coil windings in each group are easily entangled and knotted.

A conventional wiring method may include the following steps: manually inserting the first output wires of all coil windings through the accommodating holes of the corresponding guiding portion of the wiring device of the traditional motor stator, respectively; at the same time, inserting three power wires through the accommodating holes of three power input portions of the wiring device of the traditional motor stator.

However, the conventional motor stator, wiring device and wiring method as described above are disadvantageous in the following ways. Firstly, the structure of the traditional wiring device is complicated such that it is difficult to intuitively or automatically implement the winding process, not to mention the mistakes caused by human works. Secondly, the manufacturing cost is high and the manufacturing process is difficult. Thus, the conventional structure and method described above are only appropriate for 3-phase motor and are not applicable for four, five, six, or multiple-phase motor. If the conventional wiring device and method described above are used on four, five, six, or multiple-phase motors anyway, it would result in an overcomplicated structure with a huge size and considerably heavy weight.

SUMMARY OF THE INVENTION

A primary objective of the present invention is to provide a wiring device and a motor stator including the same. Herein, the present invention is characterized in that the wiring device has a simple structure. Such a wiring device may be formed through injection molding with only one single mold, thereby reducing the manufacturing cost.

Another objective of the present invention is to provide a wiring device and a wiring method using the same. Herein, the present invention is characterized in that by employing channels that corresponds to the trenches in the wiring device, the first output wires of the coil windings with different phases are respectively configured to insert through the corresponding channels at different height positions and are further configured to extend to the corresponding trenches so as to prevent the first output wires of the coil windings with different phases from entangling and knotting with one another.

Another objective of the present invention is to provide a wiring device and a wiring method using the same. Herein, the present invention is characterized in that the first output wires of the coil windings with different phases are configured to extend in the corresponding trenches, respectively. In such a way, the first output wires of the coil windings with different phases are prevented from contacting one another, thereby providing an excellent effect of electrical insulation.

Another objective of the present invention is to provide a wiring device and a wiring method using the same. Herein, the present invention is characterized in that the first output wires of the coil windings with the same phase are stacked with each other in the same trench, so as to prevent the first output wires of the coil windings with the same phase from entangling and knotting with each other. Further the first output wires extending at the same height position are also prevented from blocking with one another.

Another objective of the present invention is to provide a wiring device and a wiring method using the same. Herein, the present invention is characterized in that the structure of the wiring device may simplify the wiring process, so that an automatic wiring becomes feasible.

Another objective of the present invention is to provide a wiring device and a wiring method using the same. Herein, the present invention is characterized by shortening the extending distance of the first output wires of the coil windings in the trenches to a collection position.

Another objective of the present invention is to provide a wiring device and a wiring method using the same. Herein, the method may be applied to three, four, five, six, and multiple-phase motors.

Another objective of the present invention is to provide a wiring device and a wiring method using the same. Herein, the present invention is characterized in that the second output wires of the coil windings are well fixed and not randomly arranged.

Another objective of the present invention is to provide a wiring device and a wiring method using the same. Herein, the present invention is characterized in that the first output wires of the coil windings are not detached from the trenches.

Another objective of the present invention is to provide a wiring device and a wiring method using the same. Herein, the present invention is characterized in that the first output wires of the coil windings are not pressed and thus does not bend.

To achieve the above objectives, the present invention provides a wiring device comprising a plurality of trenches and a plurality of channel sets. The trenches at least comprise a first trench, a second trench and a third trench, which are sequentially and coaxially formed from the inside to the outside of the wiring device, and further extend along an axial direction thereof. The bottoms of the first, second and third trenches are respectively located at different height positions. Each channel set at least comprises a first channel, a second channel and a third channel. The first channels penetrate the wiring device from the outer wall thereof to the first trench, the second channels penetrate the wiring device from the outer wall thereof to the second trench, and the third channels penetrate the wiring device from the outer wall thereof to the third trench.

Preferably, the channel sets are sequentially spaced along the perimeter direction of the wiring device, and the third, first and second channels of each of the channel sets are sequentially provided and spaced along the perimeter direction of the wiring device.

Preferably, the bottoms of the trenches are located at different height positions, the number of the trenches is equal to the number of all the channels of each of the channel sets, and all the channels of each of the channel sets are configured to penetrate the wiring device from the outer sidewall thereof to the trenches, respectively.

Preferably, each first channel is configured to penetrate the wiring device from the outer sidewall thereof toward the collection position in the first trench, each second channel is configured to penetrate the wiring device from the outer sidewall thereof toward the collection position in the second trench, and each third channel is configured to penetrate the wiring device from the outer sidewall thereof toward the collection position in the third trench.

Preferably, the wiring device further comprises a plurality of fixing parts, provided and spaced on the outer sidewall of the wiring device.

To achieve the above objectives, the present invention provides a motor stator, comprising the wiring device and a core. The core comprises a plurality of first coil windings, a plurality of second coil windings, and a plurality of third coil windings, which have a first output wire and a second output wire, respectively. The wiring device is provided on the core, the first output wires of the first coil windings insert through the first channels respectively, and extend to the collection position in the first trenches along the first trenches, the first output wires of the second coil windings insert through the second channels respectively, and extend to the collection position in the second trenches along the second trenches, and the first output wires of the third coil windings insert through the third channels respectively, and extend to the collection position in the third trenches along the third trenches.

Preferably, the channel sets are sequentially provided and spaced along the perimeter direction of the wiring device, the third, first and third channels of each channel set are sequentially provided and spaced along the perimeter direction of the wiring device.

Preferably, the bottoms of the trenches are located at different height positions, the number of the trenches is equal to the number of all the channels of each channel set, and all the channels of each channel set are configured to penetrate the wiring device from the outer sidewall thereof to the trenches, respectively.

Preferably, each first channel is configured to penetrate the wiring device from the outer sidewall thereof toward the collection position in the first trench, each second channel is configured to penetrate the wiring device from the outer sidewall thereof toward the collection position in the second trench, and each third channel is configured to penetrate the wiring device from the outer sidewall thereof toward the collection position in the third trench.

Preferably, the wiring device further comprises a plurality of fixing parts, provided and spaced on the outer sidewall of the wiring device, and the second output wires of the first, second and third coil windings are fixed onto the fixing parts, respectively.

Preferably, the motor stator comprises a neutral wire provided around the outside of the wiring device, and the outside of the neutral wire is fixed onto the inside of the second output wires of the first coil windings, the inside of the second output wires of the second coil windings and the inside of the second output wires of the third coil windings.

Preferably, the motor stator further comprises a cover provided on the wiring device for sealing the first, second and third trenches.

Preferably, the second output wires of the first, second and third coil windings are bent and electrically connected to one another, thereby forming a loop.

To achieve the above objectives, the present invention provides a wiring method of a motor stator, comprising the following steps:

(a) Inserting the first output wires of the first coil windings on the core of the motor stator through the first channels of the wiring device, respectively, and further configuring the first output wires of the first coil windings to extend along the first trench of the wiring device to the collection position in the first trench.

(b) Inserting the first output wires of the second coil windings on the core of the motor stator through the second channels of the wiring device, respectively, and further configuring the first output wires of the second coil windings to extend along the second trench of the wiring device to the collection position in the second trench.

(c) Inserting the first output wires of the third coil windings on the core of the motor stator through the third channels of the wiring device, respectively, and further configuring the first output wires of the third coil windings to extend along the third trench of the wiring device to the collection position in the third trench.

The first, second and third trenches are sequentially and coaxially formed from the inside to the outside of the wiring device, and extend along the axial direction thereof. The bottoms of the first, second and third trenches are located at different height positions.

Preferably, the wiring device comprises a plurality of channel sets sequentially provided and spaced along the perimeter direction of the wiring device. Each channel set at least comprises a first channel, a second channel and a third channel. The third, first and second channels of each channel set are sequentially provided and spaced along the perimeter direction of the wiring device.

Preferably, the bottoms of the trenches are located at different height positions, the number of the trenches is equal to the number of the channels of each channel set, and all the channels of each channel set are configured to penetrate the wiring device from the outer sidewall thereof to the trenches, respectively.

Preferably, each first channel is configured to penetrate the wiring device from the outer sidewall thereof toward the collection position in the first trench, each second channel is configured to penetrate the wiring device from the outer sidewall thereof toward the collection position in the second trench, and each third channel is configured to penetrate the wiring device from the outer sidewall thereof toward the collection position in the third trench.

It is preferred that the step (a) further comprises the following steps:

Inserting the first output wires of the first coil windings through the first channels of the wiring device, and further configuring the first output wires of the first coil windings to extend to the first trenches;

Rotating the motor stator, so that the first output wires of the first coil windings extend along the first trenches to the collection position in the first trenches of the wiring device; and Moving the first output wires of the first coil windings, so that the first output wires of the first coil windings extend toward the outside of the wiring device.

Preferably, the step (b) further comprises the following steps:

Inserting the first output wires of the second coil windings through the second channels of the wiring device, respectively, and configuring the first output wires of the second coil windings to extend to the second trenches of the wiring device;

Rotating the motor stator, so that the first output wires of the second coil windings extend along the second trenches to the collection position in the second trenches of the wiring device; and Moving the first output wires of the second coil windings, so that the first output wires of the second coil windings extend toward the outside of the wiring device.

Preferably, the step (c) further comprises the following steps:

Inserting the first output wires of the third coil windings through the third channels of the wiring device, respectively, and further configuring the first output wires of the third coil windings to extend to the third trenches of the wiring device;

Rotating the motor stator, so that the first output wires of the third coil windings extend along the third trenches to the collection position in the third trenches of the wiring device; and Moving the first output wires of the third coil windings, so that the first output wires of the third coil windings extend toward the outside of the wiring device.

Preferably, the wiring method of the motor stator further comprises the step (d) of fixing the second output wires of the first, second and third coil windings onto the fixing parts of the wiring device, respectively.

Preferably, the wiring method of the motor stator further comprises the step (e) of disposing a neutral wire around the outside of the wiring device, wherein the outside of the neutral wire is fixed onto the inside of the second output wires of the first coil windings, the inside of the second output wires of the second coil windings, and the inside of the second output wires of the third coil windings.

Preferably, the wiring method of the motor stator further comprises the step (f) of disposing a cover on the wiring device for sealing the first, second and third trenches.

Preferably, the wiring method of the motor stator further comprises the step (g) of bending the second output wires of the first coil windings, the second output wires of the second coil windings, and the second output wires of the third coil windings are bent and electrically connecting to one another so as to form a loop.

One of the advantageous effects of the present invention is that the wiring device has a simple structure and can be formed through injection molding by one single mold. As a result, the wiring device may be easily manufactured and the manufacturing cost may be reduced.

Additionally, because the bottoms of the trenches of the wiring device according to the present invention are located at different height positions, the first output wires of the coil windings with different phases can respectively insert through the different channels at different height positions, and further extend to different trenches so as to prevent the first output wires of the coil windings with different phases from entangling and knotting with each other. Further, it also can prevent the first output wires extending at the same height position from entangling with one another.

Also, the first output wires of the coil windings with different phases extend in different trenches, respectively, so as to prevent the first output wires of the coil windings with different phases from contacting one another, thereby providing an excellent effect of electrical insulation.

Further, the first output wires of the coil windings with the same phase are stacked with each other in the same trench so as to prevent the first output wires of the coil windings with the same phase from entangling and knotting with each other.

Additionally, because the top ends of the trenches and the channels of the wiring device according to the present invention are open ends, the hands of the operator or the robotic arm of the automatic machine can easily hold the first output wires of the coil windings for wiring. As a result, the structure of the wiring device of the present invention is simple and suitable for a manual operator or an automatic machine to perform the wiring method of the motor stator of the present invention.

In addition, compared to the conventional wiring device structure, the wiring device of the present invention shortens the extending distance of the first output wires of the coil winding in the trenches to the collection position.

Moreover, the present invention is applicable to the multiple phase motors like three, four, five, or six phase motors.

Also, the cover may assure that the first output wires of the first, second and third coil windings are not detached from the first, second and third trenches, respectively.

Furthermore, the positions of the first through-hole, the second through-hole and the third through-hole are provided for the first output wires of the first, second and third coil windings to upwardly insert through, respectively. In such a way, the first output wires of the first, second and third coil windings are prevented from being bent because they are not pressed by the cover. As a result, the cover and the wiring device are sturdily jointed together.

BRIEF DESCRIPTION OF THE DRAWINGS

FIGS. 20-23 show flow diagrams for the wiring method of the motor stator according to the present invention

DETAILED DESCRIPTION OF THE PREFERRED EMBODIMENT

Figure 1:
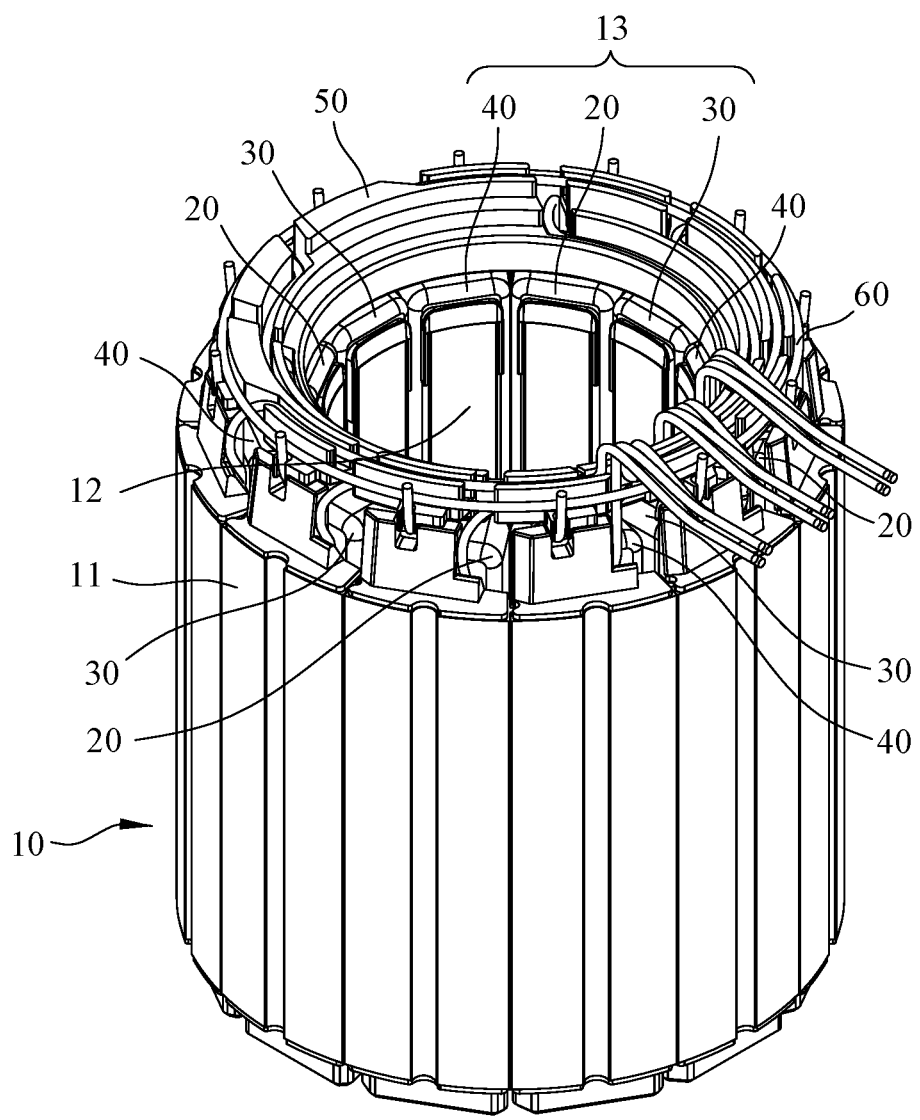
FIG. 1 is a perspective view of a motor stator according to a first embodiment of the present invention.

The accompanying drawings with reference numerals are included to provide a further detailed description of the preferred embodiments of the invention, and thus a person skilled in the art, after reading the specification, could practice the invention.

Figure 2:
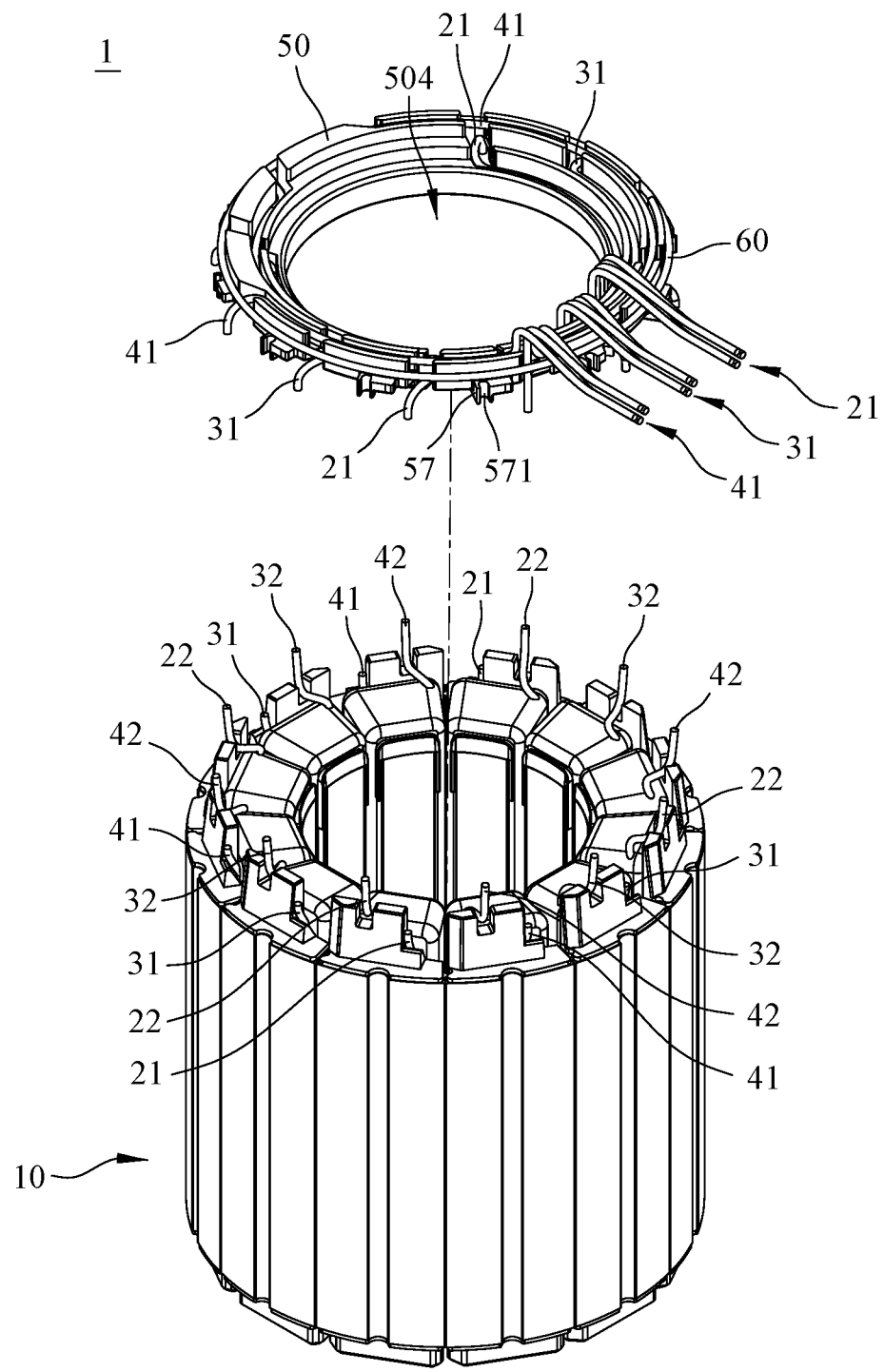
FIG. 2 is an exploded view of the motor stator according to the first embodiment of the present invention.

Please refer to FIGS. 1 and 2. FIG. 1 is a view of the motor stator according to the first embodiment of the present invention, and FIG. 2 is an exploded view of the motor stator according to the first embodiment of the present invention. The present invention provides a motor stator 1 comprising a core 10 and a wiring device 50.

As shown in FIGS. 1 and 2, the core 10 comprises a plurality of silicon steel sheets 11, a plurality of H pillars 12, a plurality of first coil windings 20, a plurality of second coil windings 30 and a plurality of third coil windings 40. The silicon steel sheets 11 are stacked and connected to one another to form a circular hollow pillar with a considerable thickness. The H pillars 12 protrude from the internal perimeter of the circular hollow pillar, and are spaced apart from each other along the internal perimeter of the circular hollow pillar. The first coil windings 20, the second coil windings 30 and the third coil windings 40 are respectively provided with first output wires 21, 31 and 41 and second output wires 22, 32 and 42. The first coil windings 20, the second coil windings 30 and the third coil windings 40 are formed by winding enameled wires around the H pillars 12. The tops and bottoms of the first coil windings 20, the second coil windings 30 and the third coil windings 40 protrude from the tops and bottoms of the H pillars 12. The first output wire 21 and the second output wire 22 of each first coil winding 20 each are located at the top of the first coil winding 20, the first output wire 31 and the second output wire 32 of each second coil winding 30 each are located at the top of the second coil winding 30, and the first output wire 41 and the second output wire 42 of each third coil winding 40 each are located at the top of the third coil winding 40.

The first coil windings 20 have the same phase, the second coil windings 30 have the same phase, and the third coil windings 40 have the same phase. In addition, the first coil windings 20, the second coil windings 30 and the third coil windings 40 have different phases from one another. In one embodiment, the phases of the first coil windings 20, the second coil windings 30 and the third coil windings 40 are U phase, V phase, and W phase, respectively. In another embodiment, the phases of the first coil windings 20, the second coil windings 30 and the third coil windings 40 are U phase, W phase, and V phase, respectively. In another embodiment, the phases of the first coil windings 20, the second coil windings 30 and the third coil windings 40 are W phase, V phase, and U phase, respectively. In another embodiment, the phases of the first coil windings 20, the second coil windings 30 and the third coil windings 40 are W phase, U phase, and V phase, respectively. In another embodiment, the phases of the first coil windings 20, the second coil windings 30 and the third coil windings 40 are V phase, U phase, and W phase, respectively. In another embodiment, the phases of the first coil windings 20, the second coil windings 30 and the third coil windings 40 are V phase, W phase, and U phase, respectively. The above embodiments are mainly applied to 3-phase motors.

Figure 3:
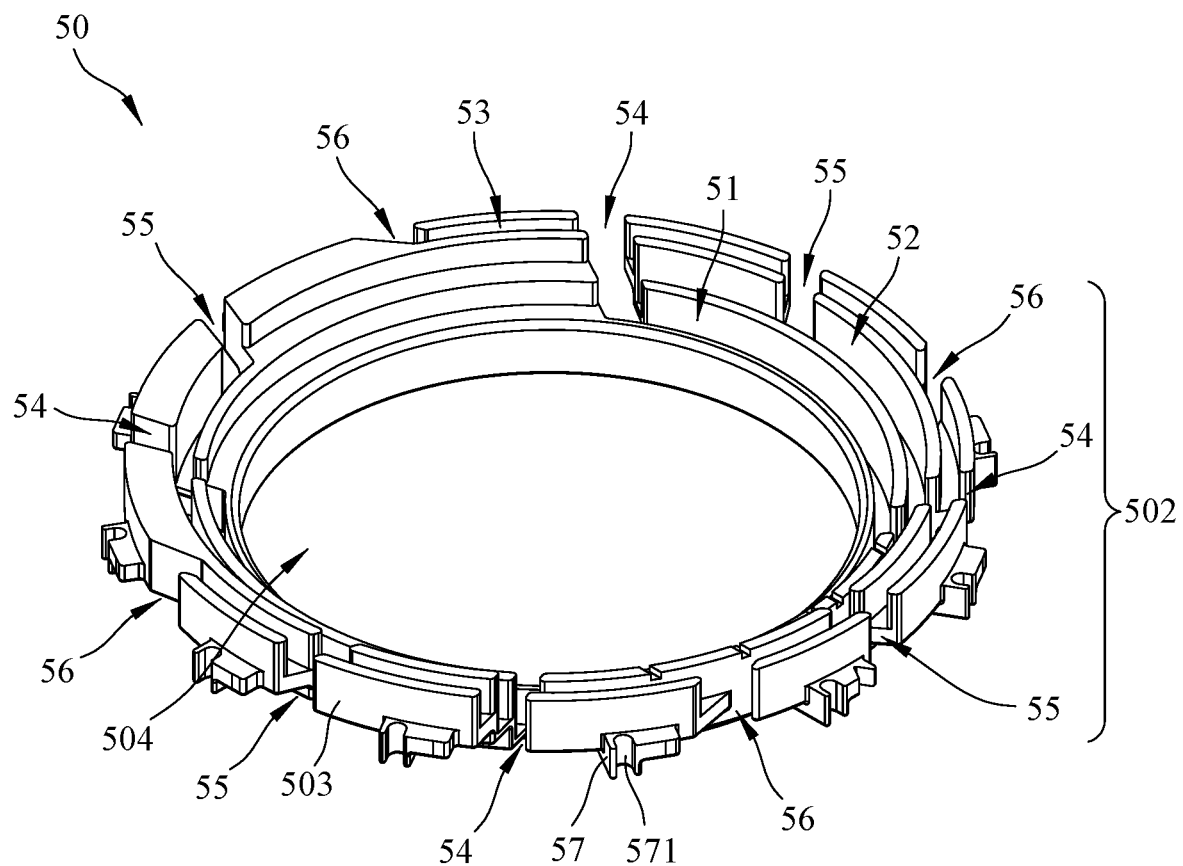
FIG. 3 is a perspective view of a wiring device according to the first embodiment of the present invention.
Figure 4:
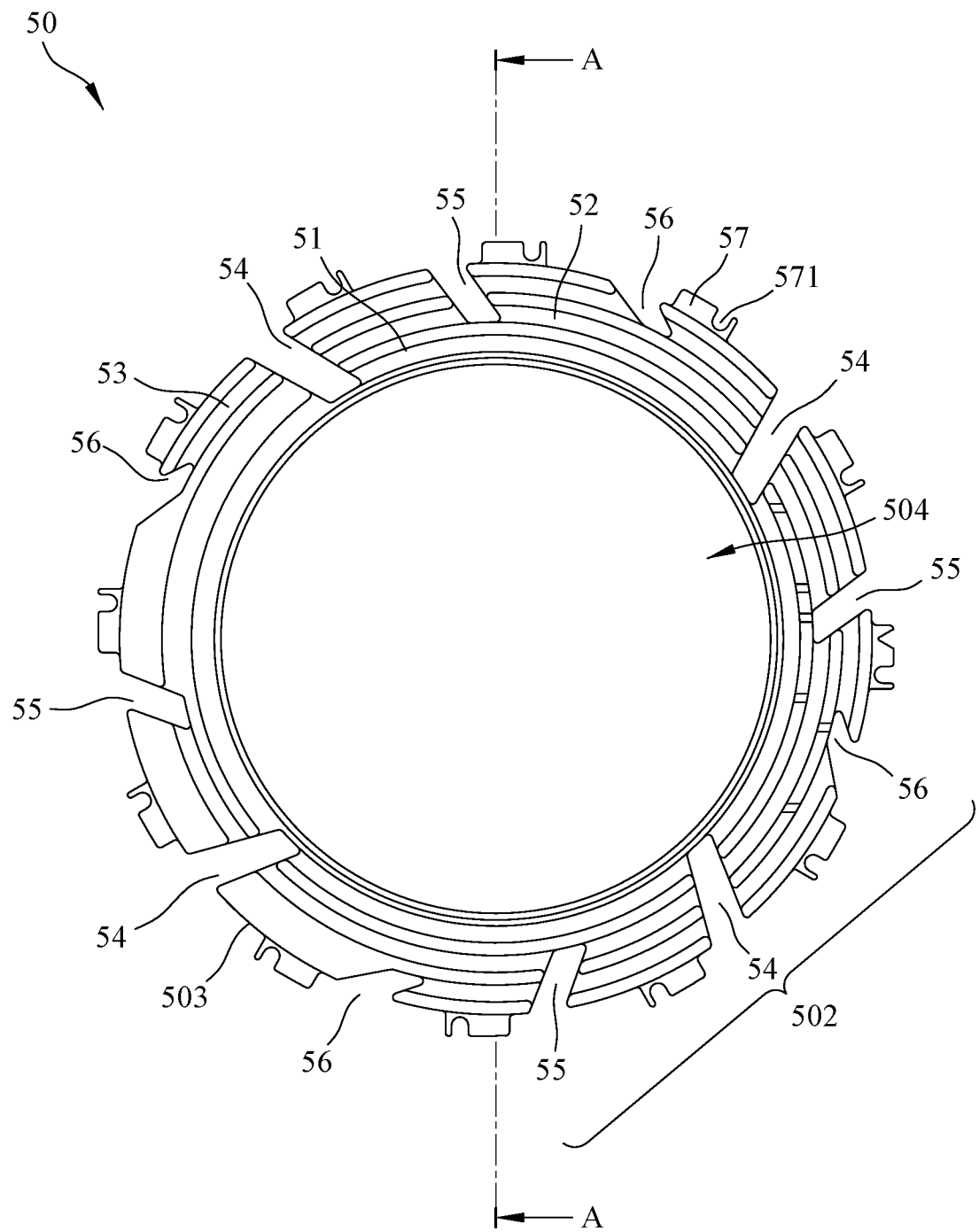
FIG. 4 is a top view of the wiring device according to the first embodiment of the present invention.
Figure 5:
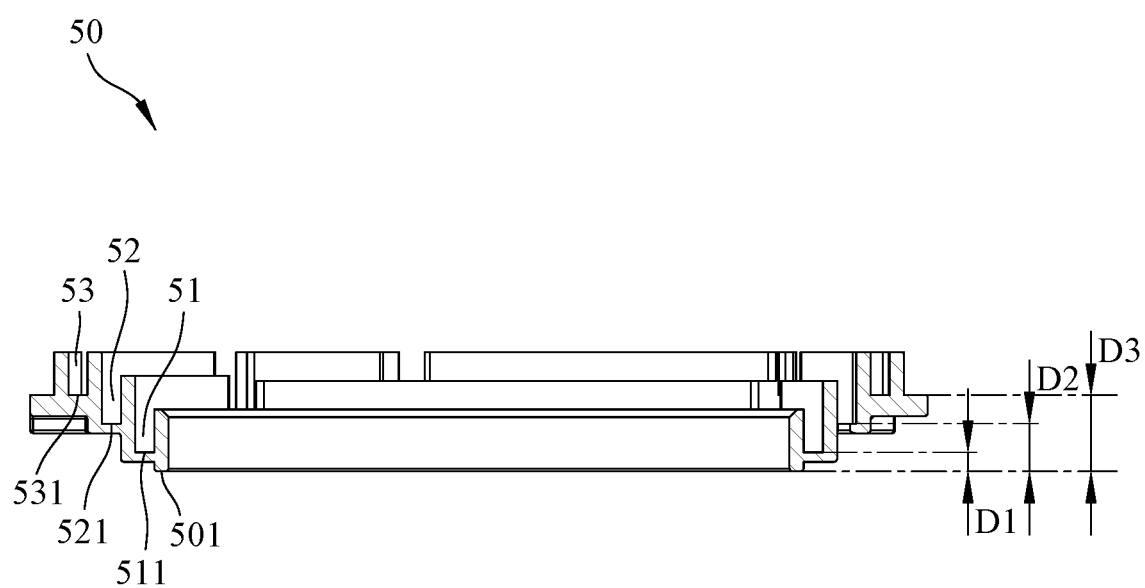
FIG. 5 is a cross-sectional view taken along the line A-A of FIG. 4.

As shown in FIGS. 1 and 2, the wiring device 50 is disposed on the core 10. More specifically, as shown in FIGS. 3 to 5, the wiring device 50 comprises a plurality of trenches and a plurality of channel sets 502. The trenches at least comprise a first trench 51, a second trench 52 and a third trench 53. Each of the channel sets 502 at least comprises a first channel 54, a second channel 55 and a third channel 56. The first trench 51, the second trench 52 and the third trench 53 are sequentially and coaxially formed from an inside (inner circumferential surface) to an outside (outer circumferential surface) of the wiring device 50, and respectively extend along the axial direction of the wiring device 50. The bottoms of the first trench 51, the second trench 52 and the third trench 53 are located at different height positions. The first channels 54 respectively penetrate the wiring device 50 from the outer sidewall 503 thereof to the first trench 51, the second channels 55 respectively penetrate the wiring device 50 from the outer sidewall 503 thereof to the second trench 52, and the third channels 56 respectively penetrate the wiring device 50 from the outer sidewall 503 thereof to the third trench 53.

More specifically, the first trench 51 is adjacent to the inside of the wiring device 50, the third trench 53 is adjacent to the outside of the wiring device 50, and the second trench 52 is between the first trench 51 and the third trench 53. In other words, the first trench 51 has the smallest diameter, and is thus closest to the axis of the wiring device 50. The third trench 53 has the largest diameter, and is thus farthest from the axis of the wiring device 50. The second trench 52 has a diameter that is between the first trench 51 and the third trench 53. Therefore, the extension length of the first channel 54 is the longest, the extension length of the third channel 56 is the shortest, and the extension length of the second channel 55 is between the first channel 54 and the third channel 56.

As shown in FIG. 5, the first trench 51, the second trench 52, and the third trench 53 respectively penetrate the top of the wiring device 50. In other words, the tops of the first trench 51, the second trench 52, and the third trench 53 are open ends, and the bottoms of the first trench 51, the second trench 52, and the third trench 53 are closed ends.

Further, the height position of the bottom of each trench is the distance from the bottom of each trench to the lowest bottom of the wiring device. The height is shorter as the distance becomes smaller. The height is taller as the distance becomes larger. The order for the height positions of the first trench 51, the second trench 52 and the third trench 53 of the wiring device according to the present invention varies to meet the actual demand of the designer. Various arrangements are described below in detail with reference to FIGS. 5 and 9-13.

As shown in FIG. 5, the distance D1 from the bottom 511 of the first trench 51 to the lowest bottom 501 of the wiring device 50 in the first embodiment is the smallest, the distance D3 from the bottom 531 of the third trench 53 to the lowest bottom 501 of the wiring device 50 is the largest, and the distance D2 from the bottom 521 of the second trench 52 to the lowest bottom 501 of the wiring device 50 is between the distance D1 and D3. In other words, the height position of the bottom 511 of the first trench 51 is the lowest, the height position of the bottom 531 of the third trench 53 is the highest, and the height position of the bottom 521 of the second trench 52 is between the two. Thus, the bottom 511 of the first trench 51 is lower than the bottom 521 of the second trench 52, and the bottom 521 of the second trench 52 is lower than the bottom 531 of the third trench 53.

Figure 9:
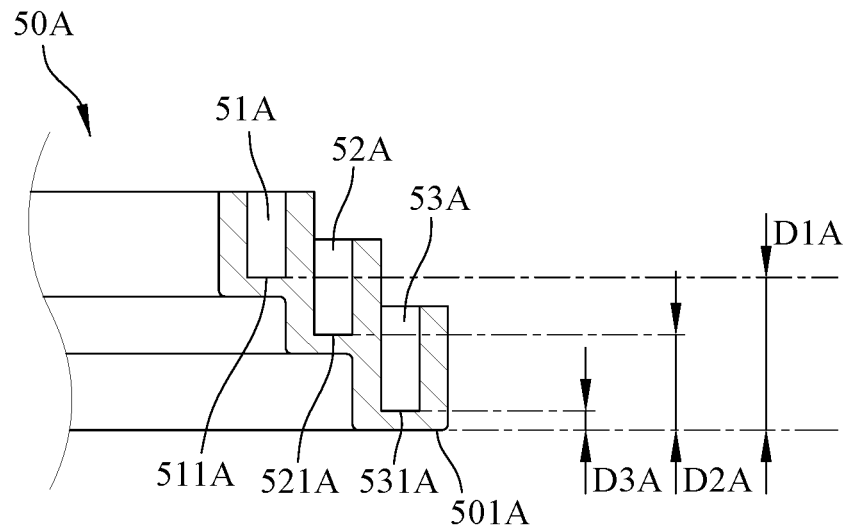
FIG. 9 is a cross-sectional view of a wiring device according to a second embodiment of the present invention.

As shown in FIG. 9, the distance D3A from the bottom 531A of the third trench 53A to the lowest bottom 501A of the wiring device 50A in the second embodiment is the smallest, the distance D1A from the bottom 511A of the first trench 51A to the lowest bottom 501A of the wiring device 50A is the largest, and the distance D2A from the bottom 521A of the second trench 52A to the lowest bottom 501A of the wiring device 50A is between the distance D1A and D3A. In other words, the height position of the bottom 531A of the third trench 53A is the lowest, the height position of the bottom 511A of the first trench 51A is the highest, and the height position of the bottom 521A of the second trench 52A is between the two. Thus, the bottom 531A of the third trench 53A is lower than the bottom 521A of the second trench 52A, and the bottom 521A of the second trench 52A is lower than the bottom 511A of the first trench 51A.

Figure 10:
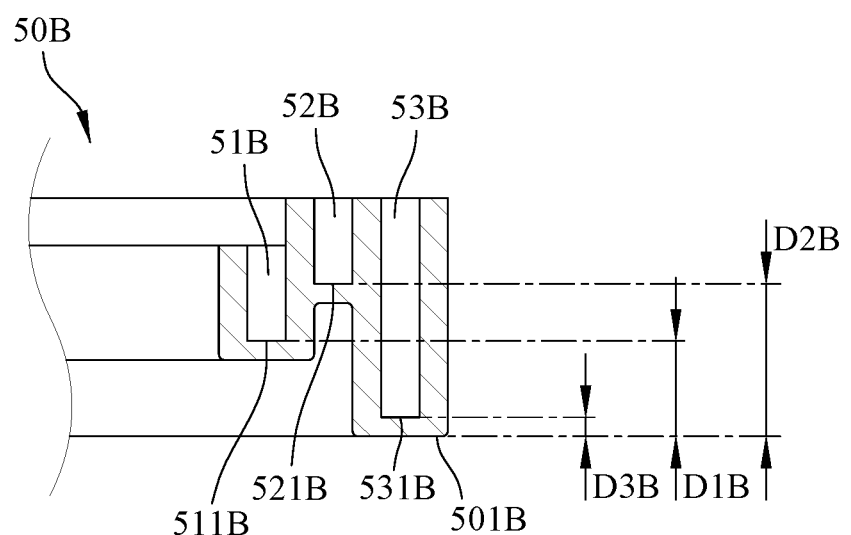
FIG. 10 is a cross-sectional view of a wiring device according to a third embodiment of the present invention.

As shown in FIG. 10, the distance D3B from the bottom 531B of the third trench 53B to the lowest bottom 501B of the wiring device 50B in the third embodiment is the smallest, the distance D2B from the bottom 521B of the second trench 52B to the lowest bottom 501B of the wiring device 50B is the largest, and the distance D1B from the bottom 511B of the first trench 51B to the lowest bottom 501B of the wiring device 50B is between the distance D2B and D3B. In other words, the height position of the bottom 531B of the third trench 53B is the lowest, the height position of the bottom 521B of the second trench 52B is the highest, and the height position of the bottom 511B of the first trench 51B is between the two. Thus, the bottom 531B of the third trench 53B is lower than the bottom 511B of the first trench 51B, and the bottom 511B of the first trench 51B is lower than the bottom 521B of the second trench 52B.

Figure 11:
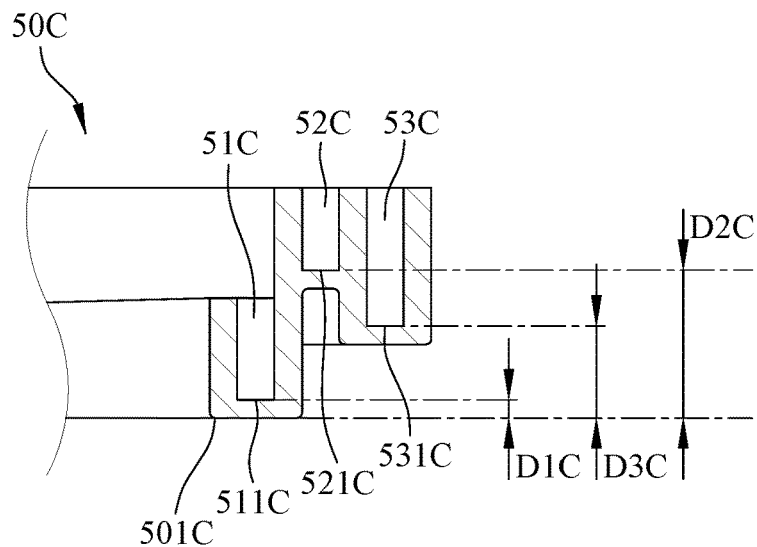
FIG. 11 is a cross-sectional view of a wiring device according to a fourth embodiment of the present invention.

As shown in FIG. 11, the distance D1C from the bottom 511C of the first trench 51C to the lowest bottom 501C of the wiring device 50C in the fourth embodiment is the smallest, the distance D2C from the bottom 521C of the second trench 52C to the lowest bottom 501C of the wiring device 50C is the largest, and the distance D3C from the bottom 531C of the third trench 53C to the lowest bottom 501C of the wiring device 50C is between the distance D1C and D2C. In other words, the height position of the bottom 511C of the first trench 51C is the lowest, the height position of the bottom 521C of the second trench 52C is the highest, and the height position of the bottom 531C of the third trench 53C is between the two. Thus, the bottom 511C of the first trench 51C is lower than the bottom 531C of the third trench 53C, and the bottom 531C of the third trench 53C is lower than the bottom 521C of the second trench 52C.

Figure 12:
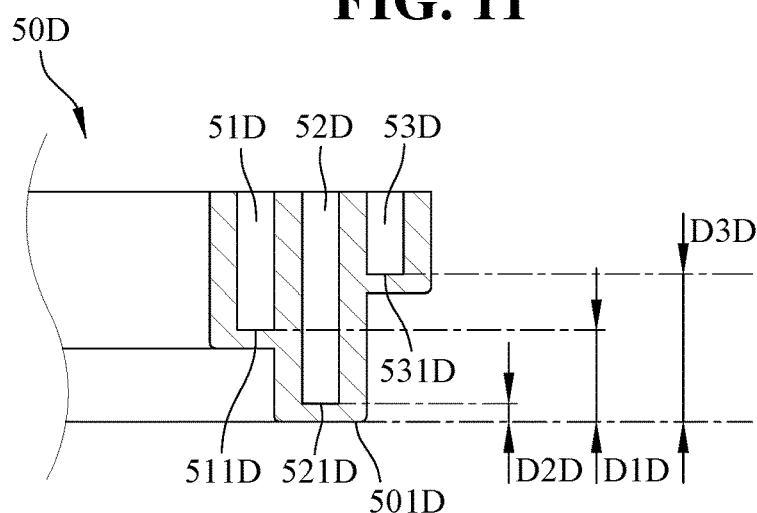
FIG. 12 is a cross-sectional view of a wiring device according to a fifth embodiment of the present invention.

As shown in FIG. 12, the distance D2D from the bottom 521D of the second trench 52D to the lowest bottom 501D of the wiring device 50D in the fifth embodiment is the smallest, the distance D3D from the bottom 531D of the third trench 53D to the lowest bottom 501D of the wiring device 50D is the largest, and the distance D1D from the bottom 511D of the first trench 51D to the lowest bottom 501D of the wiring device 50D is between the distance D2D and D3D. In other words, the height position of the bottom 521D of the second trench 52D is the lowest, the height position of the bottom 531D of the third trench 53D is the highest, and the height position of the bottom 511D of the first trench 51D is between the two. Thus, the bottom 521D of the second trench 52D is lower than the bottom 511D of the first trench 51D, and the bottom 511D of the first trench 51D is lower than the bottom 531D of the third trench 53D.

Figure 13:
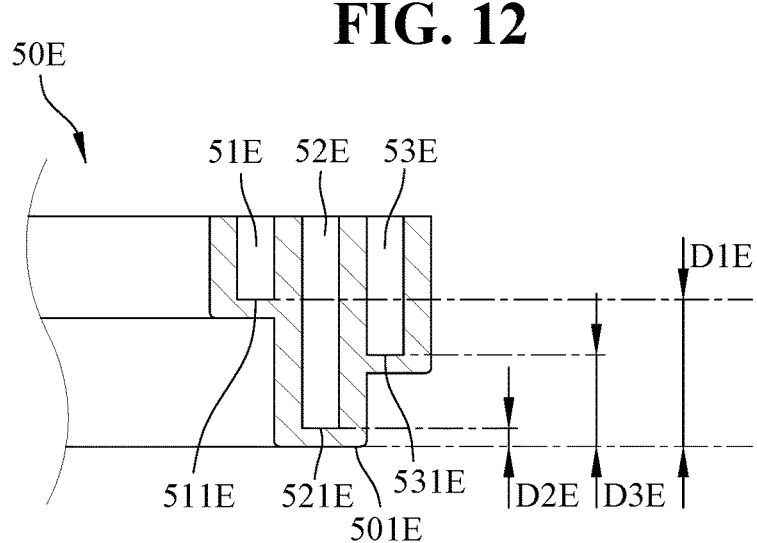
FIG. 13 is cross-sectional view of the wiring device according to the sixth embodiment of the present invention.

As shown in FIG. 13, the distance D2E from the bottom 521E of the second trench 52E to the lowest bottom 501E of the wiring device 50E in the sixth embodiment is the smallest, the distance D1E from the bottom 511E of the first trench 51E to the lowest bottom 501E of the wiring device 50E is the largest, and the distance D3E from the bottom 531E of the third trench 53E to the lowest bottom 501E of the wiring device 50E is between the distance D1E and D2E. In other words, the height position of the bottom 521E of the second trench 52E is the lowest, the height position of the bottom 511E of the first trench 51E is the highest, and the height position of the bottom 531E of the third trench 53E is between the two. Thus, the bottom 521E of the second trench 52E is lower than the bottom 531E of the third trench 53E, and the bottom 531E of the third trench 53E is lower than the bottom 511E of the first trench 51E.

Figure 15:
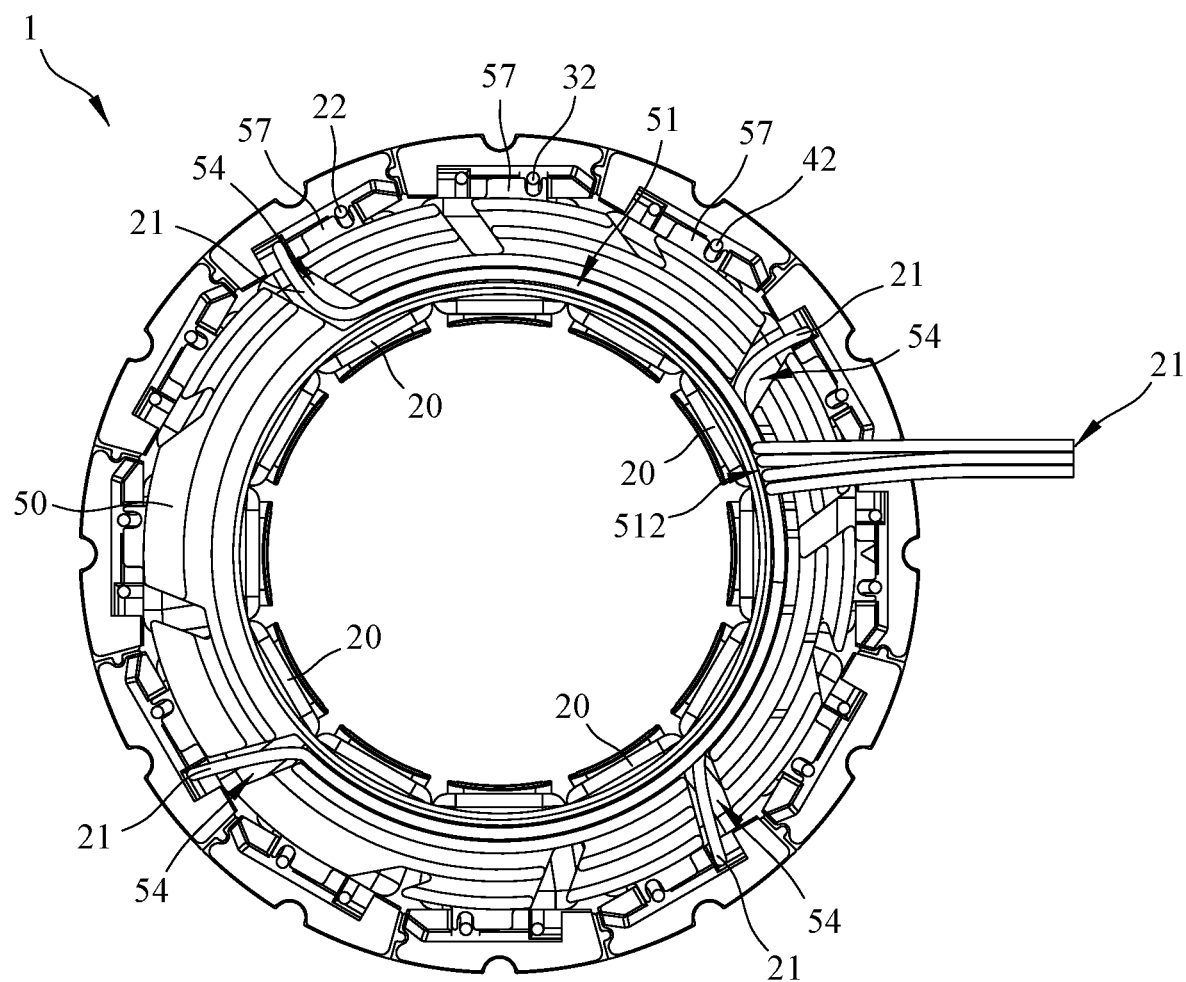
FIGS. 15-18 are views of the steps S1-S4 for a wiring method of the motor stator according to the present invention.

As shown in FIG. 15, the first output wires 21 of the first coil windings 20 are respectively configured to insert through the first channels 54 of the wiring device 50, and further configured to extend along the first trench 51 of the wiring device 50 to the collection position 512 of the first trench 51. More specifically, the first output wires 21 of the first coil windings 20 are respectively configured to insert through the first channels 54 of the wiring device 50 and further configured to extend along the first trench 51 of the wiring device 50. The motor stator 1 is rotated, so that the first output wires 21 of the first coil windings 20 extend along the first trench 51 of the wiring device 50 to the collection position 512 of the first trench 51 of the wiring device 50. The first output wires 21 of the first coil windings 20 are moved such that all the first output wires 21 of the first coil windings 20 extend toward the outside of the wiring device 50. It should be noted that the height positions at which each of the first output wires 21 of the first coil windings 20 enters into the first trench 51 are different, in turn, the first output wires 21 of the first coil windings 20 extend along the first trench 51 of the wiring device 50 to the collection position 512 of the first trench 51 of the wiring device 50 in a way that the first output wires 21 are stacked with one another, thereby preventing the first output wires 21 of the first coil windings 20 from blocking with one another due to being at the same height.

Figure 16:
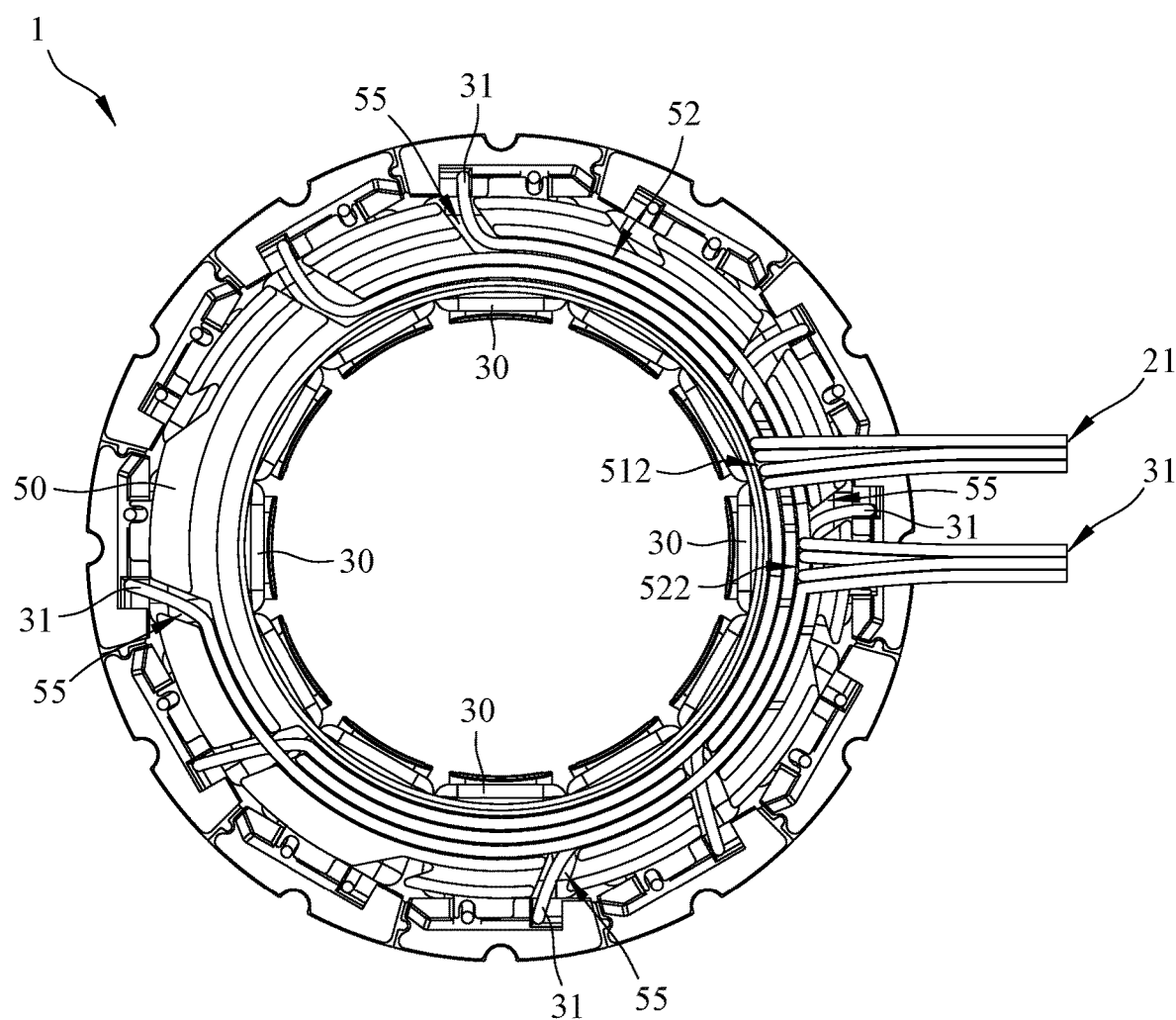

As shown in FIG. 16, the first output wires 31 of the second coil windings 30 are respectively configured to insert through the second channels 55 of the wiring device 50, and are further configured to extend along the second trench 52 of the wiring device 50 to the collection position 522 of the second trench 52. More specifically, the first output wires 31 of the second coil windings 30 are respectively configured to insert through the second channels 55 of the wiring device 50 and to extend to the second trench 52 of the wiring device 50. The motor stator 1 is rotated, so that the first output wires 31 of the second coil windings 30 extend along the second trench 52 of the wiring device 50 to the collection position 522 of the second trench 52 of the wiring device 50. The first output wires 31 of the second coil windings 30 are moved such that all the first output wires 31 of the second coil windings 30 extend toward the outside of the wiring device 50. It should be noted that the height positions at which each of the first output wires 31 of the second coil windings 30 enters into the second trench 52 are different, in turn, the first output wires 31 of the second coil windings 30 extend along the second trench 52 of the wiring device 50 to the collection position 522 of the second trench 52 of the wiring device 50 in a way that the first output wires 31 are stacked with one another, thereby preventing the first output wires 31 of the second coil windings 30 from blocking with one another due to being at the same height.

Figure 17:
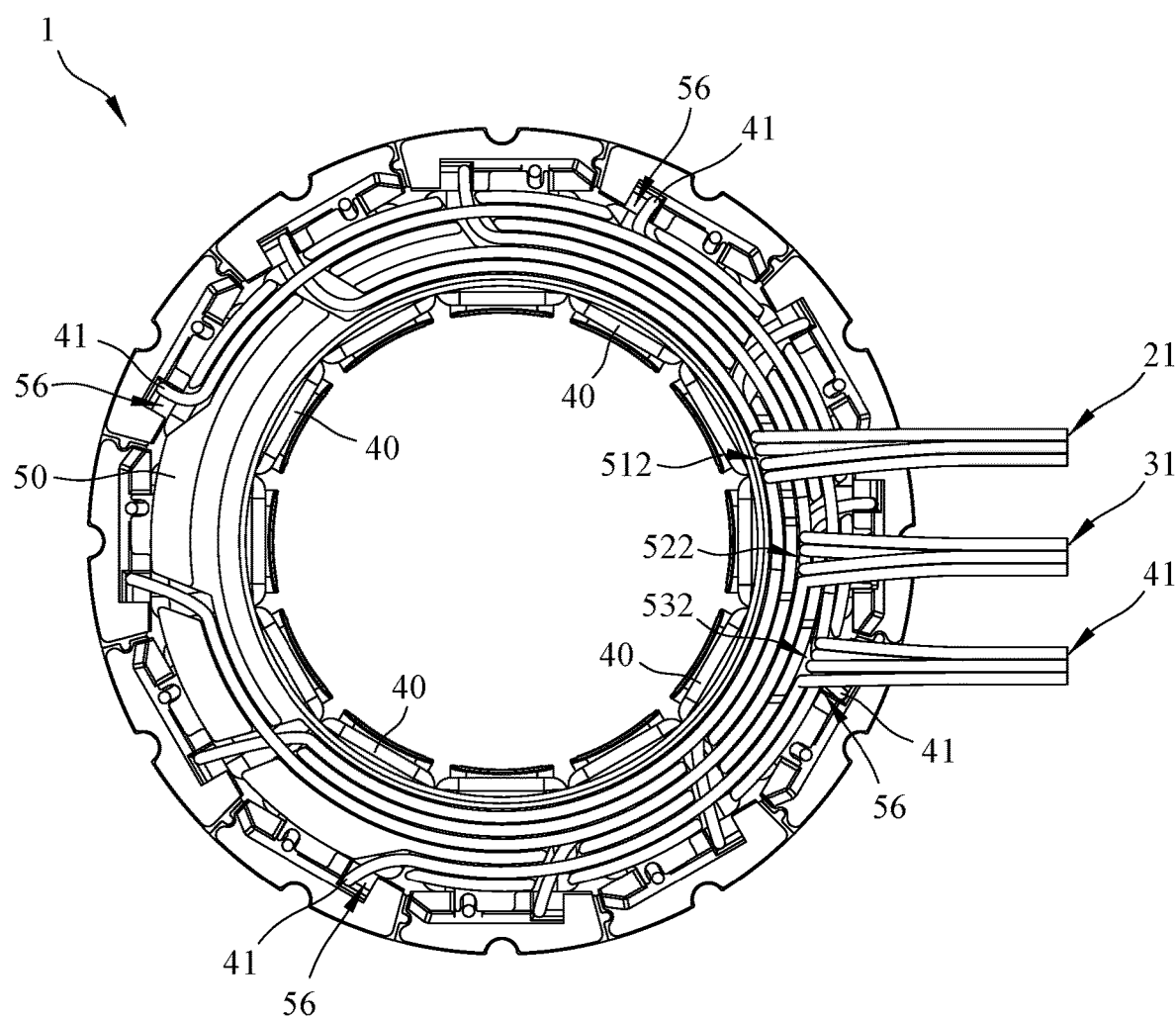

As shown in FIG. 17, the first output wires 41 of the third coil windings 40 are respectively configured to insert through the third channels 56 of the wiring device 50, and are further configured to extend along the third trench 53 of the wiring device 50 to the collection position 532 of the third trench 53. More specifically, the first output wires 41 of the third coil windings 40 are respectively configured to insert through the third channels 56 of the wiring device 50 and to extend to the third trench 53 of the wiring device 50. The motor stator 1 is rotated so that the first output wires 41 of the third coil windings 40 extend along the third trench 53 of the wiring device 50 to the collection position 532 of the third trench 53 of the wiring device 50. The first output wires 41 of the third coil windings 40 are moved such that all the first output wires 41 of the third coil windings 40 extend toward the outside of the wiring device 50. It should be noted that the height positions at which each of the first output wires 41 of the third coil windings 40 enters into the third trench 53 are different, in turn, the first output wires 41 of the third coil windings 40 extend along the third trench 53 of the wiring device 50 to the collection position 532 of the third trench 53 of the wiring device 50 in a way that the first output wires 41 are stacked with one another, thereby preventing the first output wires 41 of the third coil windings 40 from blocking with one another due to being at the same height.

The 3-phase power source (not shown) is electrically connected to the first output wires 21 of the first coil windings 20, the first output wires 31 of the second coil windings 30 and the first output wires 41 of the third coil windings 40. The 3-phase power source is connected to three loads (not shown).

The positions of the first channels 54 correspond to the positions of the first output wires 21 of the first coil windings 20, the positions of the second channels 55 correspond to the positions of the first output wires 31 of the second coil windings 30, and the positions of the third channels 56 correspond to the positions of the first output wires 41 of the third coil windings 40. With this, the first output wires 21 of the first coil windings 20 upwardly extend a small distance so as to enter into the first channels 54, the first output wires 31 of the second coil windings 30 upwardly extend a small distance so as to enter into the second channels 55, and the first output wires 41 of the third coil windings 40 upwardly extend a small distance so as to enter into the third channels 56. As a result, the first output wires 21 and the second output wires 22 of the first coil windings 20, the first output wires 31 and the second output wires 32 of the second coil windings 30, and the first output wires 41 and the second output wires 42 of the third coil windings 40 are prevented from entangling and knotting with each other.

As shown in FIGS. 3 and 4, the channel sets 502 are sequentially provided and spaced along the perimeter direction of the wiring device 50, and the third channels 56, the first channels 54, and the second channels 55 of each of the channel sets 502 are sequentially provided and spaced along the perimeter direction of the wiring device 50. As shown in FIGS. 1 and 2, the core 10 comprises a plurality of coil sets 13, and each coil set 13 at least comprises a first coil winding 20, a second coil winding 30 and a third coil winding 40. The coil sets 13 are sequentially provided and spaced along the perimeter direction of the motor stator 1, and the third coil winding 40, the first coil winding 20 and the second coil winding 30 of each coil set 13 are sequentially provided and spaced along the perimeter direction of the motor stator 1. With this, two coil windings with different phases are sequentially provided between the coil windings with the same phase so as to prevent two coil windings with the same phase being adjacent to each other. Further, the third channels 56, the first channels 54 and the second channels 55 of each of the channel sets 502 may correspond to the third coil winding 40, the first coil winding 20 and the second coil winding 30 of each coil set 13 with different phases.

The core 10 comprises four coil sets 13 in total. Thus, the number of the first coil windings 20 is four, the number of the second coil windings 30 is four, and the number of the third coil windings 40 is four. In other words, the total number of the coil windings is twelve. The number of the channel sets 502 is equal to the number of the coil sets. Therefore, the number of the first channels 54 is four, the number of the second channels 55 is four, and the number of the third channels 56 is four. It should be noted that the above numbers are only illustrative examples for clear description of the aspects of the present invention, and are not intended to limit the scope of the present invention.

As shown in FIGS. 3 and 4, each of the first channels 54 penetrates the wiring device 50 from the outer sidewall 503 thereof toward the collection position 512 in the first trench 51. As shown in FIG. 15, the first output wires 21 of the first coil windings 20 may be inserted through the first channels 54 into the first trench 51 and be guided by the extension direction of the first channels 54 toward the collection position 512 of the first trench 51. Because the junction of the first channels 54 and the first trench 51 is the starting point at which the first output wires 21 of the first coil windings 20 start to extend along the first trench 51, the above feature allows the distance from the starting point to the collection position 512 of the first trench 51, which is the extension distance of the first output wires 21 of the first coil windings 20, to shorten.

As shown in FIGS. 3 and 4, each of the second channels 55 penetrates the wiring device 50 from the outer sidewall 503 thereof toward the collection position 522 in the second trench 52. As shown in FIG. 16, the first output wires 31 of the second coil windings 30 may be inserted through the second channels 55 into the second trench 52 and be guided by the extension direction of the second channels 55 toward the collection position 522 of the second trench 52. Because the junction of the second channels 55 and the second trench 52 is the starting point at which the first output wires 31 of the second coil windings 30 start to extend along the second trench 52, the above feature allows the distance from the starting point to the collection position 522 of the second trench 52, which is the extension distance of the first output wires 31 of the second coil windings 30, to shorten.

As shown in FIGS. 3 and 4, each of the third channels 56 penetrates the wiring device 50 from the outer sidewall 503 thereof toward the collection position 532 in the third trench 53. As shown in FIG. 17, the first output wires 41 of the third coil windings 40 may be inserted through the third channels 56 into the third trench 53 and be guided by the extension direction of the third channels 56 toward the collection position 532 of the third trench 53. Because the junction of the third channels 56 and the third trench 53 is the starting point at which the first output wires 41 of the third coil windings 40 start to extend along the third trench 53, the above feature allows the distance from the starting point to the collection position 532 of the third trench 53, which is the extension distance of the first output wires 41 of the third coil windings 40, to shorten.

As shown in FIGS. 1 and 2, the collection position 512 of the first trench 51, the collection position 522 of the second trench 52 and the collection position 532 of the third trench 53 are adjacent to each other and sequentially provided along the perimeter direction of the wiring device 50. Consequently, the first output wires 21 of the first coil windings 20, the first output wires 31 of the second coil windings 30 and the first output wires 41 of the third coil windings 40 can be respectively connected to the 3-phase power source from adjacent positions.

Further, the collection position 512 of the first trench 51, the collection position 522 of the second trench 52, and the collection position 532 of the third trench 53 can be predetermined and provided at any positions of the wiring device 50 according to the above conditions.

The first channels 54, the second channels 55, and the third channels 56 respectively penetrate through the top and bottom of the wiring device 50. In other words, the top and the bottom of the first channels 54, the second channels 55 and the third channels 56 are open ends.

In short, the bottoms of the trenches of the wiring device 50 are located at different height positions. The number of the trenches is equal to the number of the channels of all the channel sets 502, and all the channels of each channel set 502 respectively penetrate the wiring device 50 from the outer sidewall thereof to the trenches. The types of phase for all the coil windings on the core 10 of the motor stator 1 according to the present invention correspond to the number of the trenches and all the channels of each channel set 502, and the core 10 of the motor stator 1 of the present invention may comprise three or more coil windings with different phases. Thus, the present invention is not only applicable to the 3-phase motor in the above embodiments, but also applicable to 4-phase, 5-phase, 6-phase and motors with more phases.

As shown in FIGS. 3 and 4, the wiring device 50 of the present invention comprises a plurality of fixing parts 57. The fixing parts 57 are provided and spaced apart on the outer sidewall 503 of the wiring device 50. The second output wires 22 of the first coil windings 20, the second output wires 32 of the second coil windings 30 and the second output wires 42 of the third coil windings 40 are respectively fixed onto the fixing parts 57. More specifically, the fixing parts 57 are respectively arranged on one side of the first channels 54, the second channels 55 and the third channels 56, and a fixing hole 571 is formed on each of the fixing parts 57. As shown in FIG. 1, the second output wires 22 of the first coil windings 20, the second output wires 32 of the second coil windings 30 and the second output wires 42 of the third coil windings 40 are respectively fixed to the fixing holes 571 of the fixing parts 57. As a result, the second output wires 22 of the first coil windings 20, the second output wires 32 of the second coil windings 30 and the second output wires 42 of the third coil windings 40 are well fixed.

As shown in FIGS. 3 and 4, each of the fixing holes 571 penetrates through the top, bottom and side of the fixing part 57, and has a top opening, a bottom opening and a side opening. The second output wires 22 of the first coil windings 20, the second output wires 32 of the second coil windings 30 and the second output wires 42 of the third coil windings 40 may easily enter the side opens of the fixing holes 571 from the outside to be fixed to the fixing holes 571.

As shown in FIG. 15, the fixing holes 571 are respectively provided right over the second output wires 22 of the first coil windings 20, the second output wires 32 of the second coil windings 30 and the second output wires 42 of the third coil windings 40. Thus, the second output wires 22 of the first coil windings 20, the second output wires 32 of the second coil windings 30 and the second output wires 42 of the third coil windings 40 may respectively enter and be fixed to the fixing holes 571 of the fixing parts 57 by extending a small distance upwardly. Consequently, the second output wires 22 of the first coil windings 20, the second output wires 32 of the second coil windings 30 and the second output wires 42 of the third coil windings 40 are prevented from entangling with one another.

As shown in FIGS. 1 and 2, the motor stator 1 of the present invention further comprises a neutral wire 60, which is provided around the outside of the wiring device 50. The neutral wire 60 is fixed to an inner side of the second output wires 22 of the first coil windings 20, an inner side of the second output wires 32 of the second coil windings 30 and an inner side of the second output wires 42 of the third coil windings 40. Specifically, the neutral wire 60 is fixed to the second output wires 22 of the first coil windings 20, the second output wires 32 of the second coil windings 30 and the second output wires 42 of the third coil windings 40 by soldering. The function of the neutral wire 60 is to electrically connect three loads, thereby providing a loop.

Figure 6:
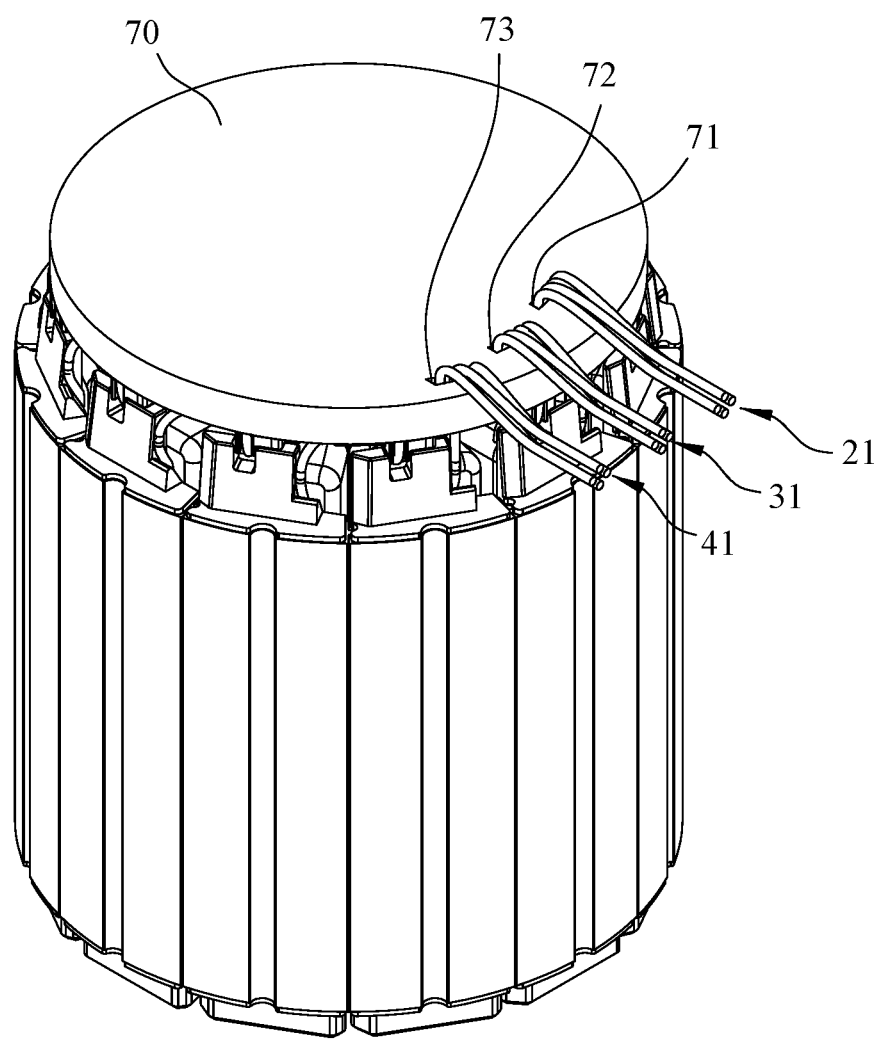
FIG. 6 is a perspective view of the motor stator with a cover according to the first embodiment of the present invention.
Figure 7:
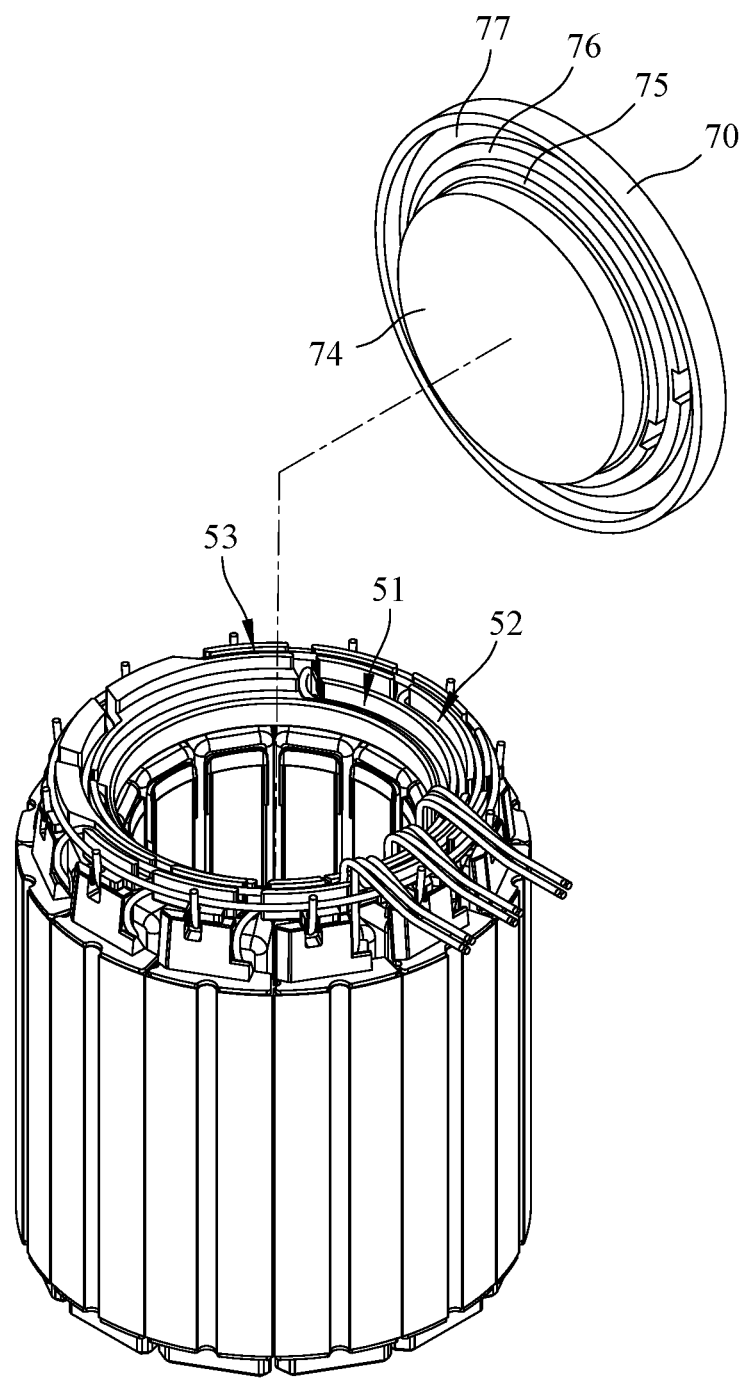
FIG. 7 is an exploded view of the motor stator with the cover according to the first embodiment of the present invention.
Figure 8:
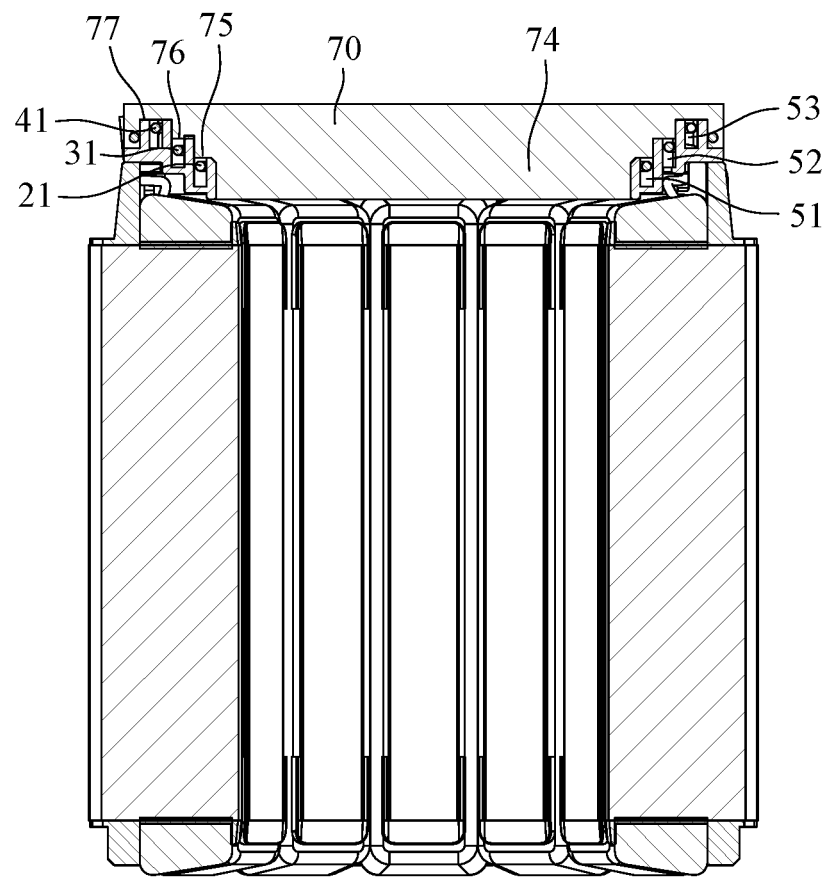
FIG. 8 is a cross-sectional view of the motor stator with the cover according to the first embodiment of the present invention.

As shown in FIGS. 6-8, the motor stator 1 of the present invention further comprises a cover 70, which is provided on the wiring device 50 for sealing the first trench 51, the second trench 52 and the third trench 53. The cover 70 is provided with a first through-hole 71, a second through-hole 72 and a third through-hole 73. The first output wires 21 of the first coil windings 20 are collected to the collection position 512 of the first trench 51 of the wiring device 50, and then insert through the first through-hole 71. The first output wires 31 of the second coil windings 30 are put together at the collection position 522 of the second trench 52 of the wiring device 50, and then are inserted through the second through-hole 72. The first output wires 41 of the third coil windings 40 are put together at the collection position 532 of the third trench 53 of the wiring device 50, and then are inserted through the third through-hole 73. the above configuration, the cover 70 ensures that the first output wires 21 of the first coil windings 20, the first output wires 31 of the second coil windings 30 and the first output wires 41 of the third coil windings 40 are not detached from the first trench 51, the second trench 52, and the third trench 53 of the wiring device 50.

Specifically, the top of the first trench 51 is higher than the top of the second trench 52, and the top of the second trench 52 is higher than the top of the third trench 53. The cover 70 is provided with a protruding part 74, a first stage 75, a second stage 76 and a third stage 77. The protruding part 74 is provided and inserted into an axial hole 504 of the wiring device 50. The first stage 75, the second stage 76 and the third stage 77 are sequentially and coaxially provided from the inside to the outside of the cover 70. That is, the first stage 75 is adjacent to the protruding part 74, the third stage 77 is adjacent to the outside of the cover 70, and the second stage 76 is provided between the first stage 75 and the third stage 77. In other words, the first stage 75 has the smallest diameter, and is closest to the axis of the cover 70. The third stage 77 has the largest diameter, and is farthest from the axis of the cover 70. The second stage 76 has a diameter that is in-between. Therefore, the first stage 75 is abutted against the top of the first trench 51 for sealing the first trench 51, thereby ensuring that the first output wires 21 of the first coil windings 20 are not respectively detached from the first trench 51. The second stage 76 is abutted against the top of the second trench 52 for sealing the second trench 52, thereby ensuring that the first output wires 31 of the second coil windings 30 are not respectively detached from the second trench 52. The third stage 77 is abutted against the top of the third trench 53 for sealing the third trench 53, thereby ensuring that the first output wires 41 of the third coil windings 40 are not respectively detached from the third trench 53.

Furthermore, the height position of the bottom of every stage is the distance from the bottom of the stage to the lowest bottom of the cover 70. The height is taller as the distance becomes greater, and the height is shorter as the distance becomes smaller.

The structure arrangement of the cover 70 (see FIGS. 6-8) in the first embodiment corresponds to the structure arrangement of the wiring device 50 in the first embodiment (see FIG. 5). More specifically, the distance between the bottom of the first stage 75 and the lowest bottom of the cover 70 is the smallest, the distance between the bottom of the third stage 77 and the lowest bottom of the cover 70 is the largest, and the distance between the bottom of the second stage 76 and the lowest bottom of the cover 70 is in-between. In other words, the height position of the bottom of the first stage 75 is the lowest, the height position of the bottom of the third stage 77 is the highest, and the height position of the bottom of the second stage 76 is in-between. Therefore, the bottom of the first stage 75 is lower than the bottom of the second stage 76, and the bottom of the second stage 76 is lower than the bottom of the third stage 77.

The structure arrangement of the cover 70 (not shown) in the second embodiment corresponds to the structure arrangement of the wiring device 50A in the second embodiment (see FIG. 9). More specifically, the distance between the bottom of the third stage 77 and the lowest bottom of the cover 70 is the smallest, the distance between the bottom of the first stage 75 and the lowest bottom of the cover 70 is the largest, and the distance between the bottom of the second stage 76 and the lowest bottom of the cover 70 is in-between. In other words, the height position of the bottom of the third stage 77 is the lowest, the height position of the bottom of the first stage 75 is the highest, and the height position of the bottom of the second stage 76 is in-between. Therefore, the bottom of the third stage 77 is lower than the bottom of the second stage 76, and the bottom of the second stage 76 is lower than the bottom of the first stage 75.

The structure arrangement of the cover 70 (not shown) in the third embodiment corresponds to the structure arrangement of the wiring device 50B in the third embodiment (see FIG. 10). More specifically, the distance between the bottom of the first stage 75 and the lowest bottom of the cover 70 is the smallest, and the distance between the bottom of the second stage 76 and the lowest bottom of the cover 70 and the distance between the bottom of the third stage 77 and the lowest bottom of the cover 70 are the largest. In other words, the height position of the bottom of the first stage 75 is the lowest, and the height positions of the bottom of the second stage 76 and the third stage 77 are the highest. Therefore, the bottom of the first stage 75 is lower than the bottom of the second stage 76 and the bottom of the third stage 77.

The structure arrangement of the cover 70 (not shown) in the fourth embodiment corresponds to the structure arrangement of the wiring device 50C in the fourth embodiment (see FIG. 11). More specifically, the distance between the bottom of the first stage 75 and the lowest bottom of the cover 70 is the smallest, and the distance between the bottom of the second stage 76 and the lowest bottom of the cover 70 and the distance between the bottom of the third stage 77 and the lowest bottom of the cover 70 are the largest. In other words, the height position of the bottom of the first stage 75 is the lowest, and the height positions of the bottom of the second stage 76 and the third stage 77 are the highest. Therefore, the bottom of the first stage 75 is lower than the bottom of the second stage 76 and the bottom of the third stage 77.

The structure arrangement of the cover 70 (not shown) in the fifth embodiment corresponds to the structure arrangement of the wiring device 50D in the fifth embodiment (see FIG. 12). More specifically, the distance between the bottom of the first stage 75 and the lowest bottom of the cover 70, the distance between the bottom of the second stage 76 and the lowest bottom of the cover 70, and the distance between the bottom of the third stage 77 and the lowest bottom of the cover 70 are the same. In other words, the bottom of the first stage 75, the bottom of the second stage 76, and the bottom of the third stage 77 have the same height position. Therefore, the bottom of the first stage 75, the bottom of the second stage 76, and the bottom of the third stage 77 are aligned with each other.

The structure arrangement of the cover 70 (not shown) in the sixth embodiment corresponds to the structure arrangement of the wiring device 50E in the sixth embodiment (see FIG. 13). More specifically, the distance between the bottom of the first stage 75 and the lowest bottom of the cover 70, the distance between the bottom of the second stage 76 and the lowest bottom of the cover 70, and the distance between the bottom of the third stage 77 and the lowest bottom of the cover 70 are the same. In other words, the bottom of the first stage 75, the bottom of the second stage 76, and the bottom of the third stage 77 have the same height position. Therefore, the bottom of the first stage 75, the bottom of the second stage 76, and the bottom of the third stage 77 are aligned with each other.

The first through-hole 71 is provided at the top of the cover 70 and corresponds to the first trench 51, the second through-hole 72 is provided at the top of the cover 70 and corresponds to the second trench 52, and the third through-hole 73 is provided at the top of the cover 70 and corresponds to the third trench 53. With the above configuration, the positions of the first through-hole 71, the second through-hole 72 and the third through-hole 73 are respectively provided such that the first output wires 21 of the first coil windings 20, the first output wires 31 of the second coil windings 30 and the first output wires 41 of the third coil windings 40 may upwardly insert through the through-holes. In such a way, the first output wires 21 of the first coil windings 20, the first output wires 31 of the second coil windings 30 and the first output wires 41 of the third coil windings 40 are prevented from being pressed and bent by the cover 70. As a result, the cover 70 may be well engaged with the wiring device 50.

Practically, the number of the through-holes in the cover 70 is equal to the number of the trenches, as such, the first output wires of the coil windings with three or more different phases may be inserted through the through-holes. Thus, the present invention is not only applicable to the 3-phase motor as described in the above embodiments, but also applicable to the 4-phase, 5-phase, 6-phase and other multiple-phase motors.

Figure 14:
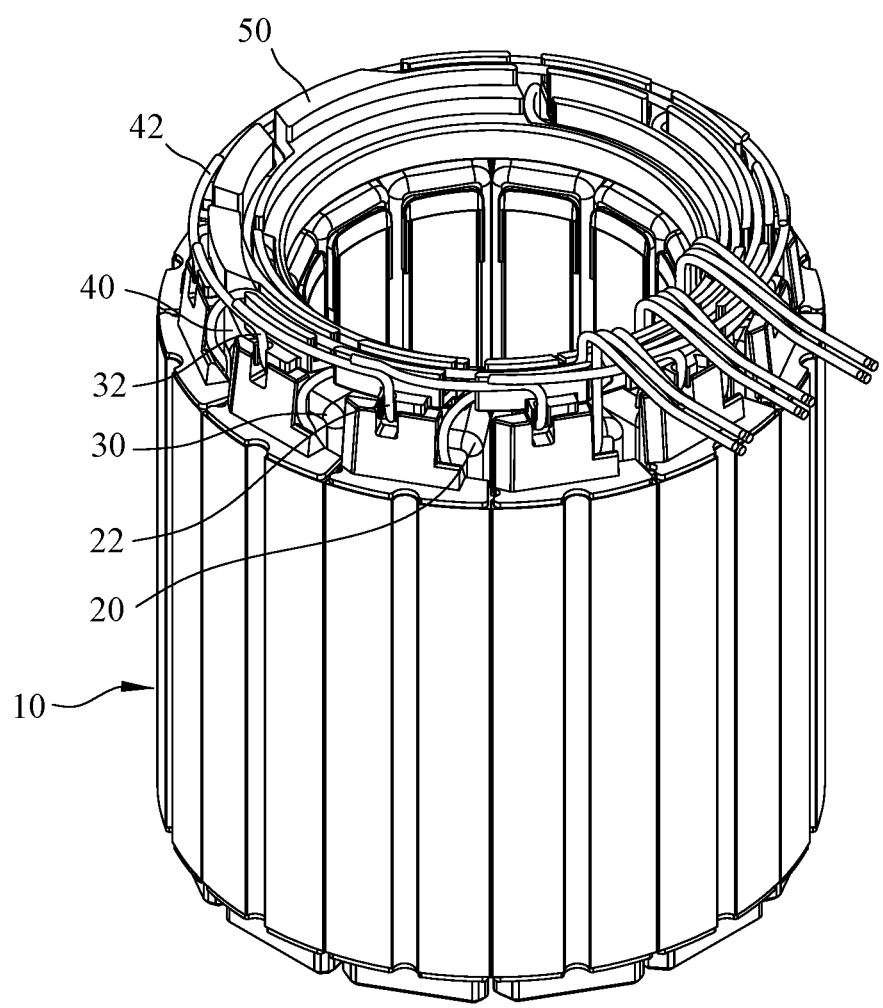
FIG. 14 is a perspective view of a motor stator according to a seventh embodiment of the present invention.

Please refer to FIG. 14, which illustrates a perspective view of the motor stator 1A according to the seventh embodiment of the present invention. As shown in FIG. 14, the core 10 and the wiring device 50 included in the motor stator 1A have the same structure as the core 10 and the wiring device 50 of the motor stator 1 in the first embodiment. Certainly, anyone of the wiring devices 50A-50E in the second to sixth embodiments can also be selected as the motor stator 1A of the seventh embodiment. The motor stator 1A of the seventh embodiment may not comprise the cover 70, or may comprise the cover 70 selected from the covers 70 of the motor stators 1 in the first to sixth embodiments. The difference between the motor stator 1A of the seventh embodiment and the motor stators 1 of the first to sixth embodiments is that the second output wires 22 of the first coil windings 20, the second output wires 32 of the second coil windings 30 and the second output wires 42 of the third coil windings 40 are connected to one another after being bent. More specifically, the second output wires 22, 32 and 42 of the coil windings are bent toward the same direction, and each of the second output wires 22, 32 and 42 is soldered on two adjacent second output wires 22, 32 and 42 for electrical connection. The second output wires 22, 32 and 42, which are connected to one another, are further electrically connected to three loads to form a loop. Thus, the function provided by the second output wires 22, 32 and 42 that are connected to one another is the same as the function provided by the neutral wire 60. In turn, the neutral wire 60 may be omitted in the motor stator 1A of the seventh embodiment, which is somewhat different in terms of structure from the motor stator 1 in the first to sixth embodiments.

Please refer to FIGS. 15 to 23, which illustrate the wiring method of a motor stator according to the present invention. The present invention provides the wiring method of the motor stator which comprises the following steps (see FIG. 20).

Figure 20:
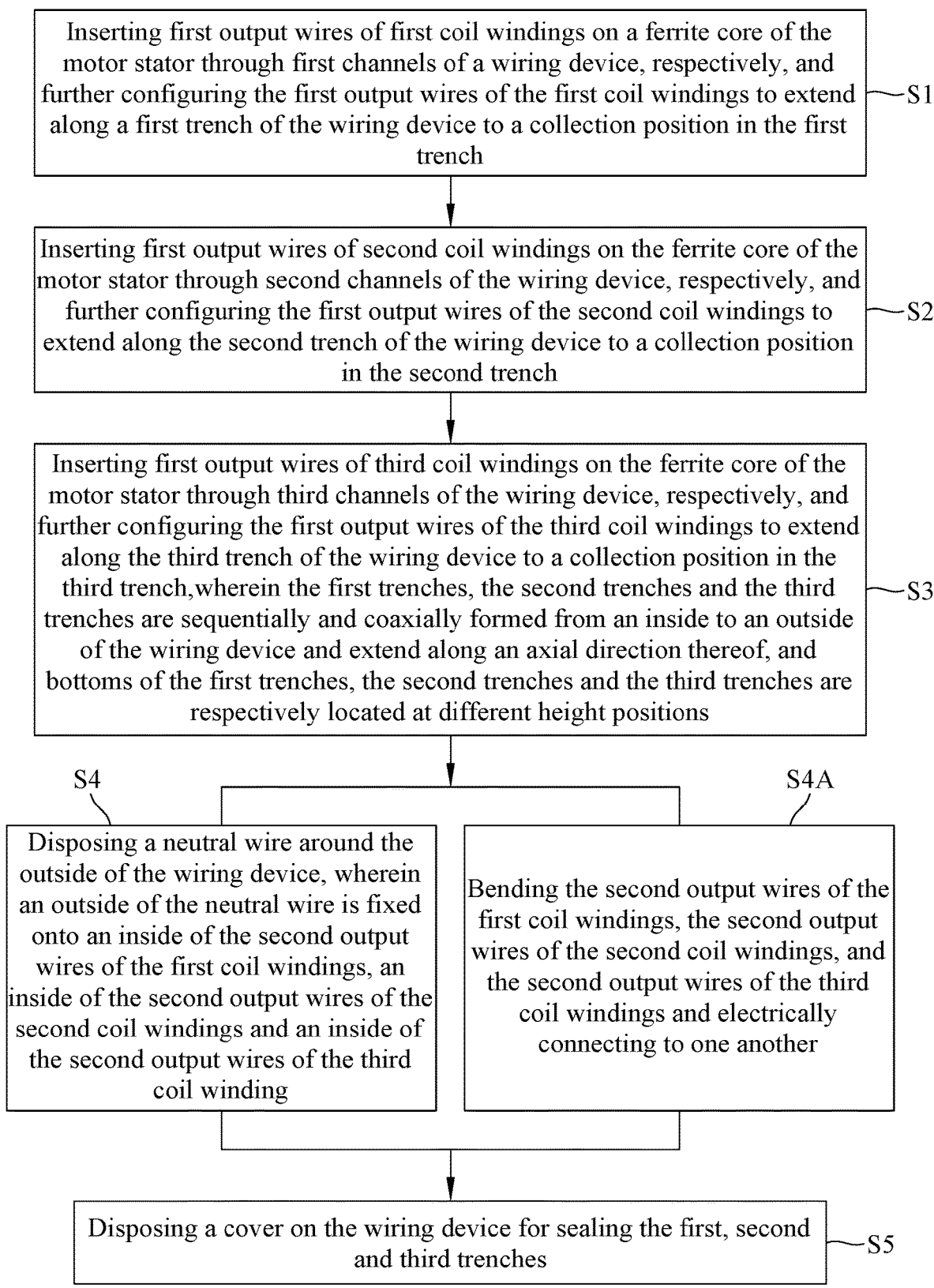
Figure 22:
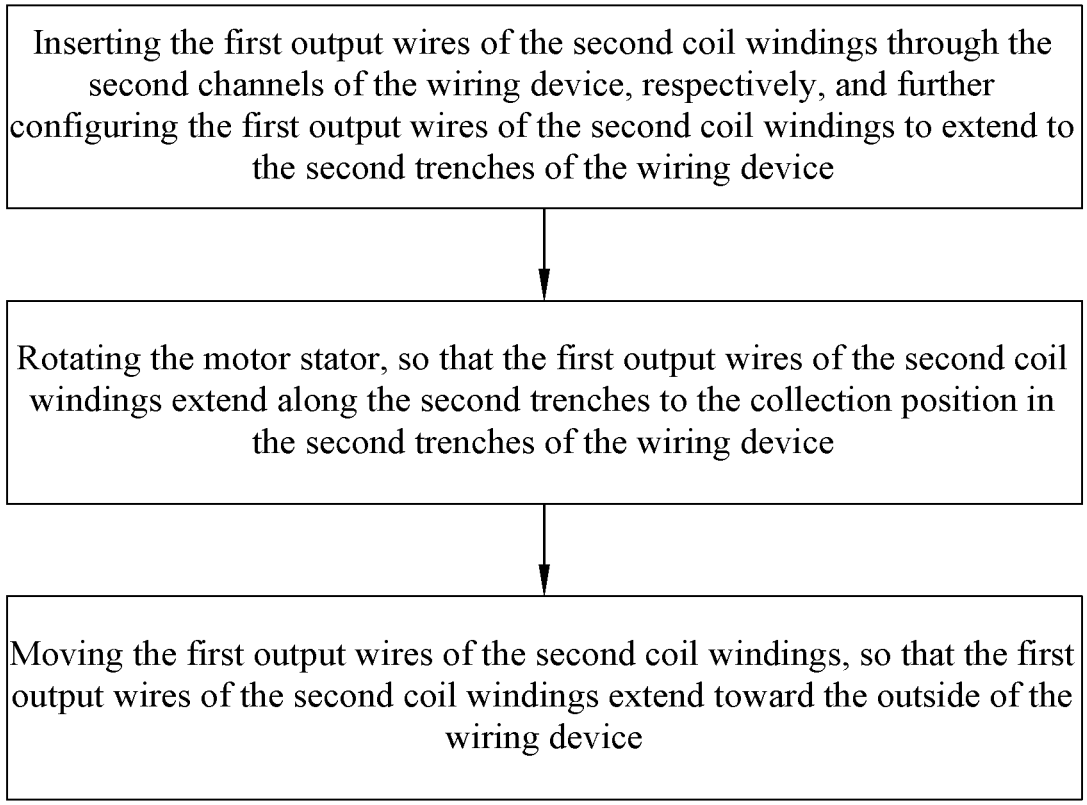

In step S1, the first output wires 21 of the first coil windings 20 on the core 10 of the motor stator 1 are inserted through the first channels 54 of the wiring device 50, respectively, and the first output wires 21 of the first coil windings 20 are further configured to extend along the first trench 51 of the wiring device 50 to the collection position 512 in the first trench 51, as shown in FIGS. 15 and 20.

Step S1 further comprises the following steps (see FIG. 21):

inserting the first output wires 21 of the first coil windings 20 through the first channels 54 of the wiring device 50, respectively, and further configuring the first output wires 21 of the first coil windings 20 to extend to the first trenches 51 of the wiring device 50;

rotating the motor stator 1, so that the first output wires 21 of the first coil windings 20 extend along the first trenches 51 to the collection position 512 in the first trench 51 of the wiring device 50; and moving the first output wires 21 of the first coil windings 20, so that the first output wires 21 of the first coil windings 20 extend toward the outside of the wiring device 50.

It should be noted that the height positions at which each of the first output wires 21 of the first coil windings 20 enters into the first trenches 51 are different, in turn, the first output wires 21 of the first coil windings 20 extend along the first trenches 51 to the collection position 512 in the first trench 51 of the wiring device 50 in a way that the first output wires 21 are stacked with one another, thereby preventing the first output wires 21 of the first coil windings 20 from blocking with one another due to being at the same height.

In step S2, the first output wires 31 of the second coil windings 30 on the core 10 of the motor stator 1 are inserted through the second channels 55 of the wiring device 50, respectively, and the first output wires 31 of the second coil windings 30 are further configured to extend along the second trench 52 of the wiring device 50 to the collection position 522 in the second trench 52, as shown in FIGS. 16 and 20.

Step S2 further comprises the following steps (see FIG. 22):

inserting the first output wires 31 of the second coil windings 30 through the second channels 55 of the wiring device 50, respectively, and further configuring the first output wires 31 of the second coil windings 30 to extend to the second trenches 52 of the wiring device 50;

rotating the motor stator 1, so that the first output wires 31 of the second coil windings 30 extend along the second trenches 52 of the wiring device 50 to the collection position 522 in the second trench 52 of the wiring device 50; and moving the first output wires 31 of the second coil windings 30, so that the first output wires 31 of the second coil windings 30 extend toward the outside of the wiring device 50.

It should be noted that the height positions at which each of the first output wires 31 of the second coil windings 30 enters into the second trench 52 are different, in turn, the first output wires 31 of the second coil windings 30 extend along the second trench 52 to the collection position 522 in the second trench 52 of the wiring device 50 in a way that the first output wires 31 are stacked with one another, thereby preventing the first output wires 31 of the second coil windings 30 from blocking with one another due to being at the same height.

In step S3, the first output wires 41 of the third coil windings 40 on the core 10 of the motor stator 1 are inserted through the third channels 56 of the wiring device 50, respectively, and the first output wires 41 of the third coil windings 40 are further configured to extend along the third trench 53 of the wiring device 50 to the collection position 532 in the third trench 53, as shown in FIGS. 17 and 20.

Step S3 further comprises the following steps (see FIG. 23):

inserting the first output wires 41 of the third coil windings 40 through the third channels 56 of the wiring device 50, respectively, and further configuring the first output wires 41 of the third coil windings 40 to extend to the third trenches 53 of the wiring device 50;

rotating the motor stator 1, so that the first output wires 41 of the third coil windings 40 extend along the third trenches 53 of the wiring device 50 to the collection position 532 in the third trench 53 of the wiring device 50; and moving the first output wires 41 of the third coil windings 40, so that the first output wires 41 of the third coil windings 40 extend toward the outside of the wiring device 50.

It should be noted that the height positions at which each of the first output wires 41 of the third coil windings 40 enters into the third trench 53 are different, in turn, the first output wires 41 of the third coil windings 40 extend along the third trench 53 to the collection position 532 in the third trench 53 of the wiring device 50 in a way that the first output wires 41 are stacked with one another, thereby preventing the first output wires 41 of the third coil windings 40 from blocking with one another due to being at the same height.

Steps S1-S3 can be manually performed or executed by the automatic machine. The operator may refer to the automatic processes of Steps S1-S3 described in detail below if he chooses to execute steps S1-S3 with automatic machines.

Step S1 further comprises the following automatic steps:

placing the motor stator 1 on a rotation device (not shown);

inserting the first output wires 21 of the first coil windings 20 by moving a plurality of first robot arms (not shown) through the first channels 54 of the wiring device 50, respectively, and further configuring the first output wires 21 of the first coil windings 20 to extend to the first trench 51 of the wiring device 50; rotating the motor stator 1 by the rotation device, so that the first output wires 21 of the first coil windings 20 extend along the first trench 51 to the collection position 512 in the first trench 51 of the wiring device 50; and moving the first output wires 21 of the first coil windings 20 by the first robot arms (not shown), so that the first output wires 21 of the first coil windings 20 altogether extend to the outside of the wiring device 50.

Step S2 further comprises the following automatic steps:

inserting the first output wires 31 of the second coil windings 30 by moving a plurality of second robot arms (not shown) through the second channels 55 of the wiring device 50, respectively, and further configuring the first output wires 31 of the second coil windings 30 to extend to the second trench 52 of the wiring device 50;

rotating the motor stator 1 by the rotation device, so that the first output wires 31 of the second coil windings 30 extend along the second trench 52 to the collection position 522 of the second trench 52 of the wiring device 50; and moving the first output wires 31 of the second coil windings 30 by the second robot arms (not shown), so that first output wires 31 of the second coil windings 30 altogether extend to the outside of the wiring device 50.

Step S3 further comprises the following automatic steps:

inserting the first output wires 41 of the third coil windings 40 by moving a plurality of third robot arms (not shown) through the third channels 56 of the wiring device 50, respectively, and further configuring the first output wires 41 of the third coil windings 40 to extend to the third trench 53 of the wiring device 50;

rotating the motor stator 1 by the rotation device, so that the first output wires 41 of the third coil windings 40 extend along the third trench 53 to the collection position 532 of the third trench 53 of the wiring device 50; and moving the first output wires 41 of the third coil windings 40 by the third robot arms (not shown), so that first output wires 41 of the third coil windings 40 altogether extend to the outside of the wiring device 50.

Figure 18:
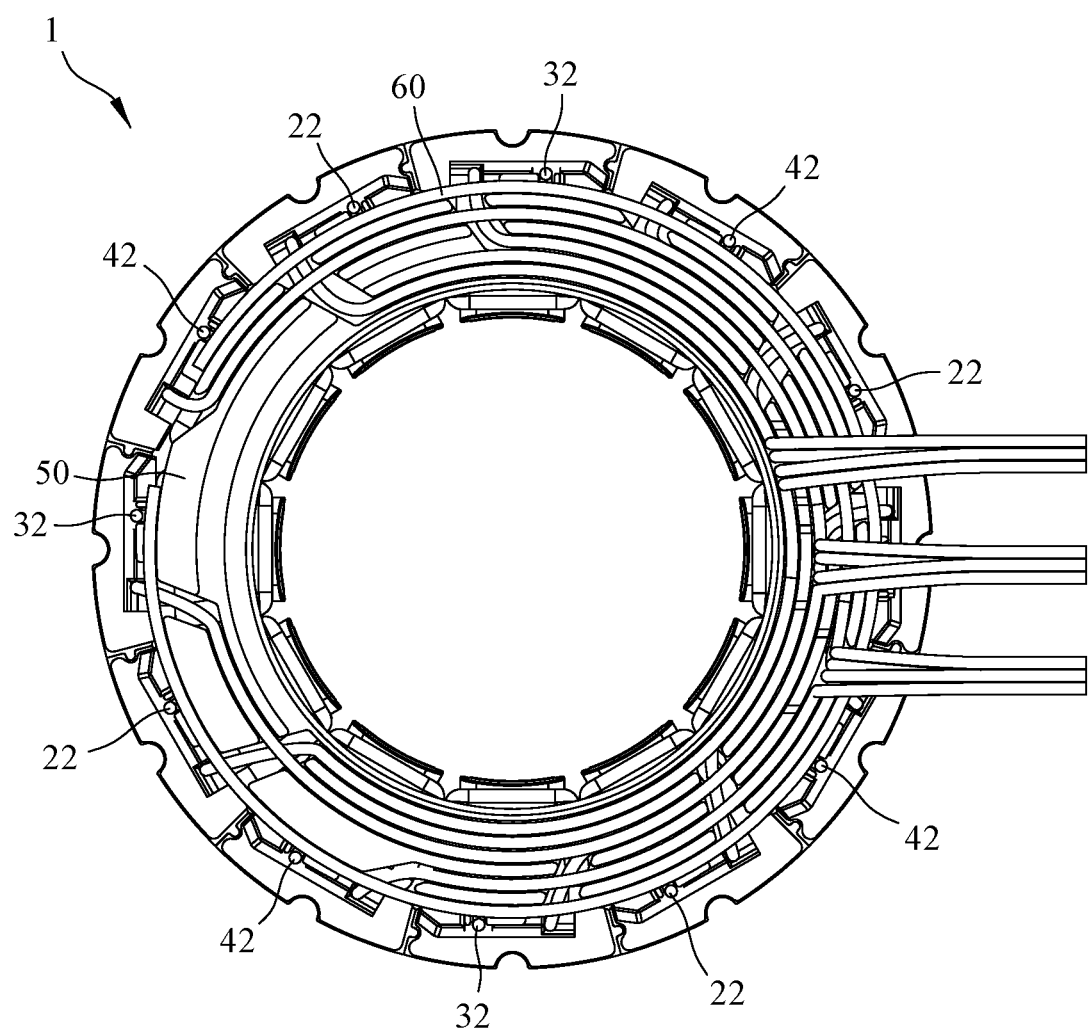

In step S4, as shown in FIGS. 18 and 20, the neutral wire 60 is provided around the outside of the wiring device 50. The neutral wire 60 is fixed to the inner side of the second output wires 22 of the first coil windings 20, the inner side of the second output wires 32 of the second coil windings 30 and the inner side of the second output wires 42 of the third coil windings 40. Specifically, the neutral wire 60 is fixed to the second output wires 22 of the first coil windings 20, the second output wires 32 of the second coil windings 30, and the second output wires 42 of the third coil windings 40 by soldering. The function of the neutral wire 60 is to electrically connect three loads, thereby providing a loop.

An additional step as described below is performed before step S1, between steps S1 and S2, between steps S2 and S3 or between steps S3 and S4.

The second output wires 22 of the first coil windings 20, the second output wires 32 of the second coil windings 30 and the second output wires 42 of the third coil windings 40 are fixed to the fixing holes 571 of the fixing parts 57 of the wiring device 50, respectively. As such, the second output wires 22 of the first coil windings 20, the second output wires 32 of the second coil windings 30 and the second output wires 42 of the third coil windings 40 are well fixed.

In step S5, as shown in FIGS. 6 and 20, the cover 70 is provided on the wiring device 50 for sealing the first trenches 51, the second trenches 52 and the third trenches 53. More specifically, the first output wires 21 of the first coil windings 20 are put together at the collection position 512 of the first trench 51 and then are inserted through the first through-hole 71 of the cover 70. The first output wires 31 of the second coil windings 30 are put together at the collection position 522 of the second trench 52, and then are inserted through the second through-hole 72 of the cover 70. The first output wires 41 of the third coil windings 40 are put together at the collection position 532 of the third trench 53, and then are inserted through the third through-hole 73 of the cover 70. As such, the cover 70 ensures that the first output wires 21 of the first coil windings 20, the first output wires 31 of the second coil windings 30 and the first output wires 41 of the third coil windings 40 are not respectively detached from the first trench 51, the second trench 52 and the third trench 53 of the wiring device 50.

Figure 19:
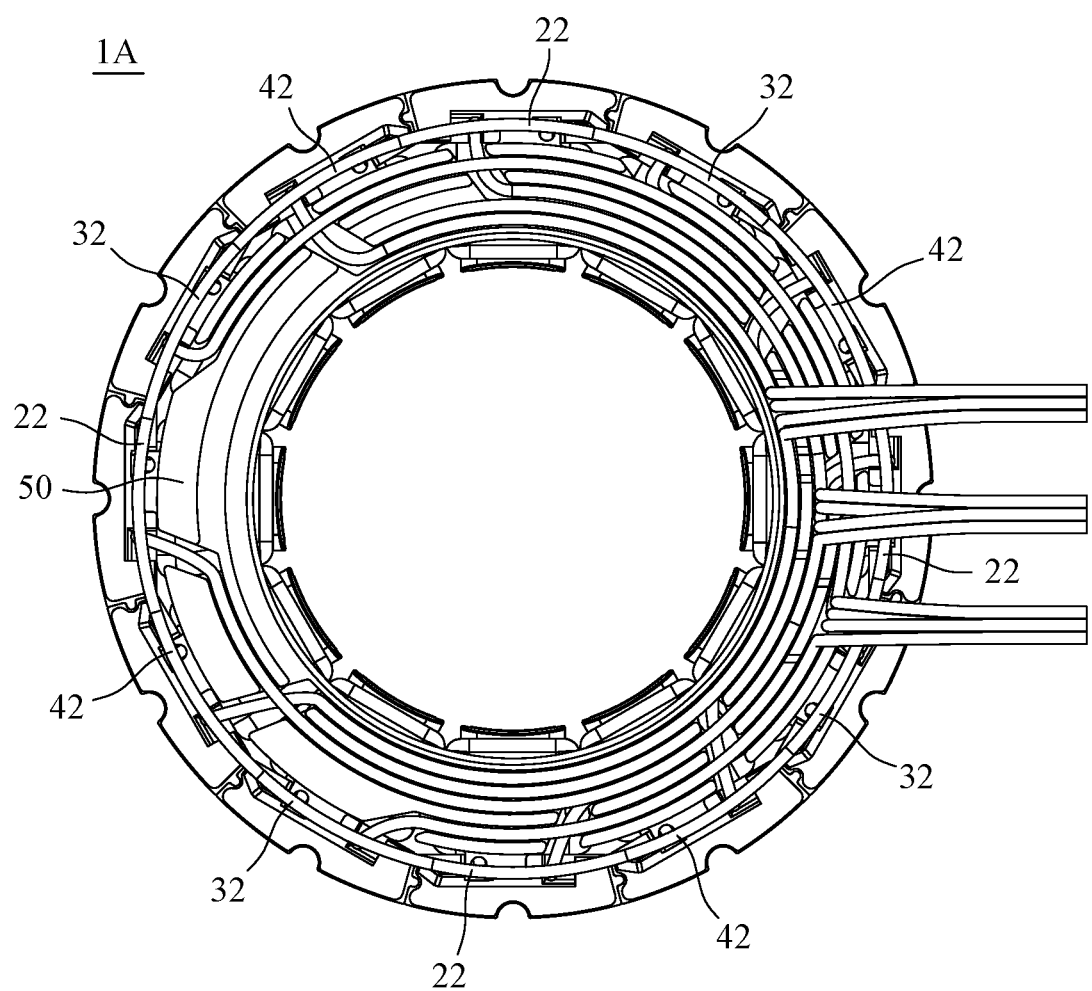
FIG. 19 is a view of the step S4A for the wiring method of the motor stator according to the present invention.

Please refer to FIG. 19, which illustrates step S4A of the wiring method of the motor stator according to the present invention. In the wiring method of the motor stator, step S4 can be replaced by step S4A. In step S4A, as shown in FIGS. 19 and 20, the second output wires 22 of the first coil windings 20, the second output wires 32 of the second coil windings 30 and the second output wires 42 of the third coil windings 40 are bent and then electrically connected to one another, thereby forming a loop. More specifically, all the second output wires 22, 32 and 42 of the coil windings are altogether bent toward the same direction, and each of the second output wires 22, 32 and 42 is soldered between two adjacent second output wires 22, 32 and 42 to form electrical connection. The second output wires 22, 32 and 42 mutually connected with each other are further connected to three loads, thereby forming a loop. Thus, the function provided by the second output wires 22, 32 and 42 that are connected to one another is the same as the function provided by the neutral wire 60. In turn, the neutral wire 60 may be omitted in the motor stator 1A, which is somewhat different from the motor stator 1 in structure.

By the wiring method of the motor stator 1 of the present invention, a three-phase power may be electrically connected to the first output wires 21 of the first coil windings 20, the first output wires 31 of the second output wires 30 and the first output wires 41 of the third coil windings 40. The three phase power is further connected to three loads, respectively.

When the motor stator 1 of the present invention is applied to a four, five, six or multiple-phase motor, one additional step is added after step S3. Herein, the first output wires of the added coil windings with at least one different phases are inserted through the at least one additional channel of the wiring device, and are further configured to extend along the at least one additional channel of the wiring device to a collection position of the at least one additional channel. In step S5, at least one additional through-hole is formed on the cover for the first output wires of the at least one additional coil winding to insert through.

In summary, the wiring device of the present invention has a simple structure and can be formed through injection molding by only one single mold. As a result, the wiring device may be easily manufactured and the manufacturing cost may be reduced.

In addition, because the bottoms of the trenches of the wiring device according to the present invention are located at different height positions, the first output wires of the coil winding with different phases can be respectively insert through the different channels at different height positions, and can further be configured to extend to different trenches so as to prevent the first output wires of the coil windings with different phases from entangling and knotting with each other. Further, it also can prevent the first output wires extending at the same height position from entangling with one another.

Further, the first output wires of the coil windings with different phases respectively extend in different trenches to prevent the first output wires of the coil windings with different phases from contacting one another. Thus, the effect of electrical insulation is excellent.

Further, the first output wires of the coil windings with the same phase are stacked with each other in the same trench so as to prevent the first output wires of the coil windings with the same phase from entangling and knotting with each other.

Furthermore, because the top ends of the trenches and the channels of the wiring device according to the present invention are open ends, the hands of the operator or the robotic arm of the automatic machine can easily hold the first output wires of the coil windings for wiring. Also, because each trench has a corresponding channel, the first output wires can be inserted through each channel and can be configured to directly extend to the corresponding trench during the wiring process, thereby making the whole wiring process simpler and more intuitive. Thus, the structure of the wiring device of the present invention is suitable for a manual operator or an automatic machine to perform the wiring method of the motor stator according to the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wiring device, comprising:
   a plurality of trenches at least comprising a first trench, a second trench and a third trench, the first, second and third trenches sequentially and coaxially formed from an inside to an outside of the wiring device and extending along an axial direction thereof, wherein bottoms of the first, second and third trenches are respectively located at different height positions; and
   a plurality of channel sets, each of the channel sets at least comprising a first channel, a second channel and a third channel, the first channels respectively penetrating the wiring device from an outer sidewall thereof to the first trench, the second channels respectively penetrating the wiring device from the outer sidewall thereof to the second trench, and the third channels respectively penetrating the wiring device from the outer sidewall thereof to the third trench;
   wherein the first channel is configured to penetrate the wiring device from the outer sidewall thereof toward a collection position in the first trench, the second channel is configured to penetrate the wiring device from the outer sidewall thereof toward a collection position in the second trench, and the third channel is configured to penetrate the wiring device from the outer sidewall thereof toward a collection position in the third trench.

2. The wiring device as claimed in claim 1, wherein the channel sets are sequentially provided and spaced along a perimeter direction of the wiring device, the third, first and second channels of each of the channel sets are sequentially provided and spaced along the perimeter direction of the wiring device.

3. The wiring device as claimed in claim 1, wherein the bottoms of the trenches are located at different height positions, a number of the trenches is equal to a number of all the channels of each of the channel sets, and all the channels of each of the channel sets are configured to penetrate the wiring device from the outer sidewall thereof to the trenches, respectively.

4. The wiring device as claimed in claim 1, further comprising a plurality of fixing parts provided and spaced apart on the outer sidewall of the wiring device.

5. A motor stator, comprising the wiring device as claimed in claim 1 and further comprising:
   a core comprising a plurality of first coil windings, a plurality of second coil windings and a plurality of third coil windings, the first, second and third coil windings having a first output wire and a second output wire, respectively,
   wherein the wiring device is provided on the core, the first output wires of the first coil windings are respectively configured to insert through the first channels and to extend to a collection position in the first trenches along the first trenches, the first output wires of the second coil windings are respectively configured to insert through the second channels and to extend to a collection position in the second trenches along the second trenches, and the first output wires of the third coil windings are respectively configured to insert through the third channels and to extend to a collection position in the third trenches along the third trenches.

6. The motor stator as claimed in claim 5, wherein the channel sets are sequentially provided and spaced along a perimeter direction of the wiring device, the third, first and second channel of each of the channel sets are sequentially provided and spaced along the perimeter direction of the wiring device.

7. The motor stator as claimed in claim 5, wherein the bottoms of the trenches are located at different height positions, a number of the trenches is equal to a number of the channels of each of the channel sets, and all the channels of each of the channel sets are configured to penetrate the wiring device from the outer sidewall thereof to the trenches, respectively.

8. The motor stator as claimed in claim 5, wherein the wiring device further comprises a plurality of fixing parts provided and spaced apart on the outer sidewall of the wiring device, and the second output wires of the first, second and third coil windings are fixed onto the fixing parts, respectively.

9. The motor stator as claimed in claim 5, further comprising a neutral wire provided around an outside of the wiring device, an outside of the neutral wire fixed onto an inside of the second output wires of the first coil windings, an inside of the second output wires of the second coil windings and an inside of the second output wires of the third coil windings.

10. The motor stator as claimed in claim 5, further comprising a cover provided on the wiring device for sealing the first, second and third trenches.

11. The motor stator as claimed in claim 5, wherein the second output wires of the first, second and third coil windings are bent and electrically connected with one another.

12. A wiring method of a motor stator, comprising the steps of:
(a) inserting first output wires of first coil windings on a core of the motor stator through first channels of a wiring device, respectively, and further configuring the first output wires of the first coil windings to extend along a first trench of the wiring device to a collection position in the first trench;
(b) inserting first output wires of second coil windings on the core of the motor stator through second channels of the wiring device, respectively, and further configuring the first output wires of the second coil windings to extend along the second trench of the wiring device to a collection position in the second trench; and
(c) inserting first output wires of third coil windings on the core of the motor stator through third channels of the wiring device, respectively, and further configuring the first output wires of the third coil windings to extend along the third trench of the wiring device to a collection position in the third trench,
wherein the first trenches, the second trenches and the third trenches are sequentially and coaxially formed from an inside to an outside of the wiring device and extend along an axial direction thereof, and bottoms of the first trenches, the second trenches and the third trenches are respectively located at different height positions; and
the first channel is configured to penetrate the wiring device from an outer sidewall thereof toward a collection position in the first trench, the second channel is configured to penetrate the wiring device from the outer sidewall thereof toward a collection position in the second trench, and the third channel is configured to penetrate the wiring device from the outer sidewall thereof toward a collection position in the third trench.

13. The wiring method as claimed in claim 12, wherein the wiring device comprises a plurality of channel sets sequentially provided and spaced along a perimeter direction of the wiring device, each of the channel sets at least comprising a first channel, a second channel and a third channel, the first, second and third channels of each of the channel sets sequentially provided and spaced along the perimeter direction of the wiring device.

14. The wiring method as claimed in claim 13, wherein the bottoms of the trenches are located at different height positions, a number of the trenches is equal to a number of the channels of each of the channel sets, and all the channels of each of the channel sets are configured to penetrate the wiring device from an outer sidewall thereof to the trenches, respectively.

15. The wiring method as claimed in claim 12, wherein the step (a) further comprises the following steps of:
inserting the first output wires of the first coil windings through the first channels of the wiring device, respectively, and further configuring the first output wires of the first coil windings to extend to the first trenches of the wiring device;
rotating the motor stator, so that the first output wires of the first coil windings extend along the first trenches to the collection position in the first trenches of the wiring device; and
moving the first output wires of the first coil windings, so that the first output wires of the first coil windings extend toward the outside of the wiring device,
wherein the step (b) further comprises the following steps of:
inserting the first output wires of the second coil windings through the second channels of the wiring device, respectively, and further configuring the first output wires of the second coil windings to extend to the second trenches of the wiring device;
rotating the motor stator, so that the first output wires of the second coil windings extend along the second trenches to the collection position in the second trenches of the wiring device; and
moving the first output wires of the second coil windings, so that the first output wires of the second coil windings extend toward the outside of the wiring device,
wherein the step (c) further comprises the following steps of:
inserting the first output wires of the third coil windings through the third channels of the wiring device, respectively, and further configuring the first output wires of the third coil windings to extend to the third trenches of the wiring device;
rotating the motor stator, so that the first output wires of the third coil windings extend along the third trenches to the collection position in the third trenches of the wiring device; and
moving the first output wires of the third coil windings, so that the first output wires of the third coil windings extend toward the outside of the wiring device.

16. The wiring method as claimed in claim 12, further comprising a step (d) of fixing the second output wires of the first, second and third coil windings onto fixing parts of the wiring device, respectively.

17. The wiring method as claimed in claim 12, further comprising a step (e) of disposing a neutral wire around the outside of the wiring device, wherein an outside of the neutral wire is fixed onto an inside of the second output wires of the first coil windings, an inside of the second output wires of the second coil windings and an inside of the second output wires of the third coil winding.

18. The wiring method as claimed in claim 12, further comprising a step (f) of disposing a cover on the wiring device for sealing the first, second and third trenches.

19. The wiring method as claimed in claim 12, further comprising a step (g) of bending the second output wires of the first coil windings, the second output wires of the second coil windings, and the second output wires of the third coil windings and electrically connecting to one another.

* * * * *